(12) United States Patent
Jeon et al.

(10) Patent No.: US 12,079,030 B2
(45) Date of Patent: *Sep. 3, 2024

(54) DISPLAY DEVICE

(71) Applicant: LG ELECTRONICS INC., Seoul (KR)

(72) Inventors: Kukyoul Jeon, Seoul (KR); Hyunjin Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/427,506

(22) Filed: Jan. 30, 2024

(65) Prior Publication Data
US 2024/0168517 A1  May 23, 2024

Related U.S. Application Data

(63) Continuation of application No. 18/132,136, filed on Apr. 7, 2023.

(30) Foreign Application Priority Data

Apr. 8, 2022 (KR) .................. 10-2022-0044095

(51) Int. Cl.
*G06F 1/16* (2006.01)
*F16M 11/02* (2006.01)
(Continued)

(52) U.S. Cl.
CPC .......... *G06F 1/1607* (2013.01); *F16M 11/42* (2013.01); *F16M 11/02* (2013.01); *F16M 11/20* (2013.01); *F16M 2200/08* (2013.01)

(58) Field of Classification Search
CPC .... F16M 11/00; F16M 11/20; F16M 2200/04; F16M 2200/08; F16M 11/42; F16M 11/02; G06F 1/1607; Y02E 60/10
See application file for complete search history.

(56) References Cited

U.S. PATENT DOCUMENTS 10,941,898 B1 * 3/2021 McCall ................ F16M 11/10
2003/0142468 A1 * 7/2003 Chin ........................ A47B 9/20
361/679.02

(Continued)

FOREIGN PATENT DOCUMENTS

CN 115370907 A * 11/2022
CN 218510523 U * 2/2023
(Continued)

OTHER PUBLICATIONS

Korean Intellectual Property Office Application No. 10-2022-0044095, Notice of Allowance dated Apr. 28, 2023, 2 pages.

*Primary Examiner* — Nidhi Thaker
(74) *Attorney, Agent, or Firm* — LEE, HONG, DEGERMAN, KANG & WAIMEY

(57) ABSTRACT

A display device is provided. The display device of the present disclosure may include: a head including a display panel; an arm to which the head is pivotally coupled; a pole to which the arm is coupled; and a base to which the pole is coupled, wherein the base includes: a lower body forming a bottom; an upper body which is coupled to the lower body and to which the pole is fixed; a weight disposed between the lower body and the upper body; and a wheel disposed outside of the lower body, passing through the lower body and coupled to the weight.

19 Claims, 40 Drawing Sheets

(51) Int. Cl.
*F16M 11/20* (2006.01)
*F16M 11/42* (2006.01)

(56) References Cited

U.S. PATENT DOCUMENTS

| | | | | |
|---|---|---|---|---|
| 2006/0054752 A1* | 3/2006 | Huang | ............... | F16M 13/02 |
| | | | | 248/125.1 |
| 2006/0196998 A1* | 9/2006 | Matteo | ............... | F16M 11/08 |
| | | | | 248/921 |
| 2008/0158446 A1* | 7/2008 | Yan | ............... | H04N 5/655 |
| | | | | 348/836 |
| 2008/0239638 A1* | 10/2008 | Chinuki | ............... | F16M 11/42 |
| | | | | 361/679.07 |
| 2010/0157513 A1* | 6/2010 | Guo | ............... | F16M 11/045 |
| | | | | 361/679.01 |
| 2013/0200579 A1* | 8/2013 | Abernethy | ............... | B62B 3/001 |
| | | | | 280/6.15 |
| 2015/0227127 A1* | 8/2015 | Miller | ............... | G16H 20/13 |
| | | | | 700/244 |
| 2016/0183768 A1* | 6/2016 | Kan | ............... | F16M 11/105 |
| | | | | 211/85.13 |
| 2021/0034098 A1* | 2/2021 | Kang | ............... | G06F 1/1632 |
| 2023/0324954 A1 | 10/2023 | Jeon et al. | | |
| 2023/0380089 A1* | 11/2023 | Honda | ............... | B60B 33/00 |

FOREIGN PATENT DOCUMENTS

| | | | | | |
|---|---|---|---|---|---|
| CN | 218510608 | U | * | 2/2023 | |
| CN | 218997749 | U | * | 5/2023 | |
| CN | 116838887 | A | * | 10/2023 | |
| JP | 2001149156 | | | 6/2001 | |
| KR | 2019990041184 | | | 12/1999 | |
| KR | 101370908 | | | 3/2014 | |
| KR | 101370908 | B1 | * | 3/2014 | |
| KR | 1020210073474 | | | 6/2021 | |
| KR | 20210121809 | A | * | 10/2021 | |
| KR | 1020210121809 | | | 10/2021 | |
| WO | WO-9746824 | A1 | * | 12/1997 | ............ A47B 21/00 |
| WO | WO-2016195139 | A1 | * | 12/2016 | ............ F16M 11/42 |

* cited by examiner

DISPLAY DEVICE

CROSS-REFERENCE TO THE RELATED APPLICATIONS

This application is a continuation of U.S. patent application Ser. No. 18/132,136, filed on Apr. 7, 2023, which claims the benefit of earlier filing date and right of priority to Korean Patent Application No. 10-2022-0044095, filed on Apr. 8, 2022, the contents of which are all hereby incorporated by reference herein in their entirety.

BACKGROUND OF THE INVENTION

1. Field of the Invention

The present disclosure relates to a display device.

2. Description of the Related Art

With the development of the information society, there have been growing demands for various types of display devices, and in order to meet these demands, various display devices, such as a liquid crystal display (LCD), a plasma display panel (PDP), an electroluminescent display (ELD), a vacuum fluorescent display (VFD), an organic light emitting diode (OLED), etc., have been studied and used recently.

Among them, the LCD panel includes a TFT substrate and a color substrate which are positioned opposite each other with a liquid crystal layer interposed therebetween, and displays images by using light emitted from a backlight unit. Further, the OLED panel may display images by using a self light-emitting organic layer deposited on a substrate on which transparent electrodes are formed.

Recently, a structure for freely adjusting an angle or position of a display panel is actively researched.

SUMMARY OF THE INVENTION

It is an objective of the present disclosure to solve the above and other problems.

Another object of the present disclosure may be to provide a display device including a stand for a display panel.

Another object of the present disclosure may be to provide a structure for freely adjusting an angle or position of a head having a display panel.

Another object of the present disclosure may be to provide a structure for allowing various motions of a head, including a pivot motion, a tilt motion, a swivel motion, and an elevating motion, to be performed independently of each other.

Another object of the present disclosure may be to provide a structure for improving standing stability of a display device.

Another object of the present disclosure may be to provide a structure for improving driving stability of a moving base having a wheel.

In accordance with an aspect of the present disclosure, the above and other objectives can be accomplished by providing a display device including: a head including a display panel; an arm to which the head is pivotally coupled; a pole to which the arm is coupled; and a base to which the pole is coupled, wherein the base includes: a lower body forming a bottom; an upper body which is coupled to the lower body and to which the pole is fixed; a weight disposed between the lower body and the upper body; and a wheel disposed outside of the lower body, passing through the lower body and coupled to the weight.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises," "includes," "has," etc. specify the presence of features, numbers, steps, operations, elements, components, or combinations thereof described in the specification, but do not preclude the presence or addition of one or more other features, numbers, steps, operations, elements, components, or combinations thereof.

In the embodiments illustrated in the figures, representations of directions, such as up (U), down (D), left (Le), right (Ri), front (F), and rear (R) are merely for convenience of explanation, and are not intended to limit the technical features disclosed in this specification.

Figure 1:
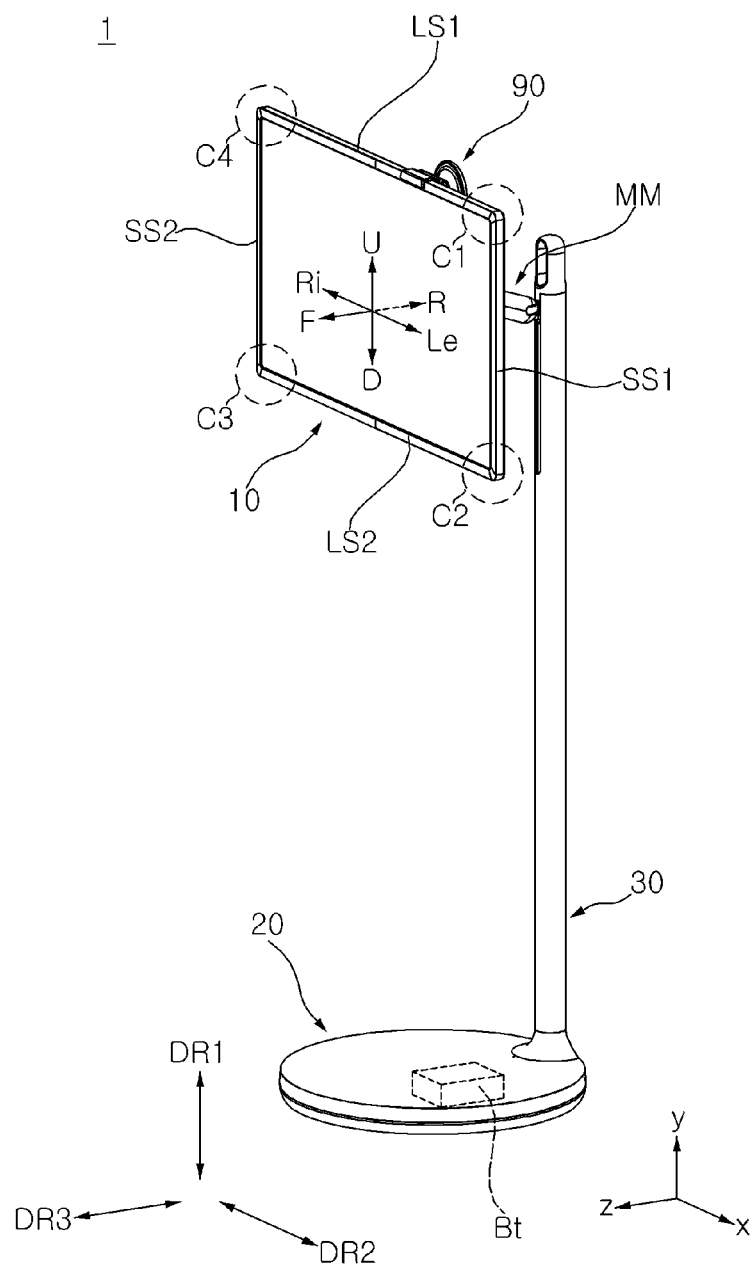
FIGS. 1 to 40 are diagrams illustrating examples of a display device according to embodiments of the present disclosure.

Referring to FIG. 1, a display device 1 may include a head 10. The head 10 may display images. The head 10 may be referred to as a display 10 or a display unit 10.

The head 10 may include a first long side LS1, a second long side LS2 opposite to the first long side LS1, a first short side SS1 adjacent to the first long side LS1 and the second long side LS2, and a second short side SS2 opposite to the first short side SS1. For convenience of explanation, it is illustrated and described that the first and second long sides LS1 and LS2 are longer than the first and second short sides SS1 and SS2, but it is also possible that lengths of the first and second long sides LS1 and LS2 may be approximately equal to lengths of the first and second short sides SS1 and SS2.

A direction parallel to the short sides SS1 and SS2 of the head 10 may be referred to as a first direction DR1 or an up-down direction. A direction parallel to the long sides LS1 and LS2 of the head 10 may be referred to as a second direction DR2 or a left-right direction. A direction perpendicular to the long sides LS1 and LS2 and the short sides SS1 and SS2 of the head 10 may be referred to as a third direction DR3 or a front-rear direction.

A side on which the head 10 displays an image may be referred to as a front side F, z, and a side opposite thereto may be referred to as a rear side R. The first short side SS1 may be referred to as a left side Le, x, and the second short side SS2 may be referred to as a right side Ri. The first long side LS1 may be referred to as an upper side U, y, and the second ling side LS2 may be referred to as a lower side D.

The first long side LS1, the second long side LS2, the first short side SS1, and the second short side SS2 may be referred to as edges of the head 10. Further, positions where the first long side LS1, the second long side LS2, the first short side SS1, and the second short side SS2 meet each other may be referred to as corners.

A position where the first short side SS1 and the first long side LS1 meet each other may be referred to as a first corner C1. A position where the first short side SS1 and the second long side LS2 meet each other may be referred to as a second corner C2. A position where the second short side SS2 and the second long side LS2 meet each other may be referred to as a third corner C2. A position where the second short side SS2 and the first long side LS1 meet each other may be referred to as a fourth corner C4.

Figure 2:
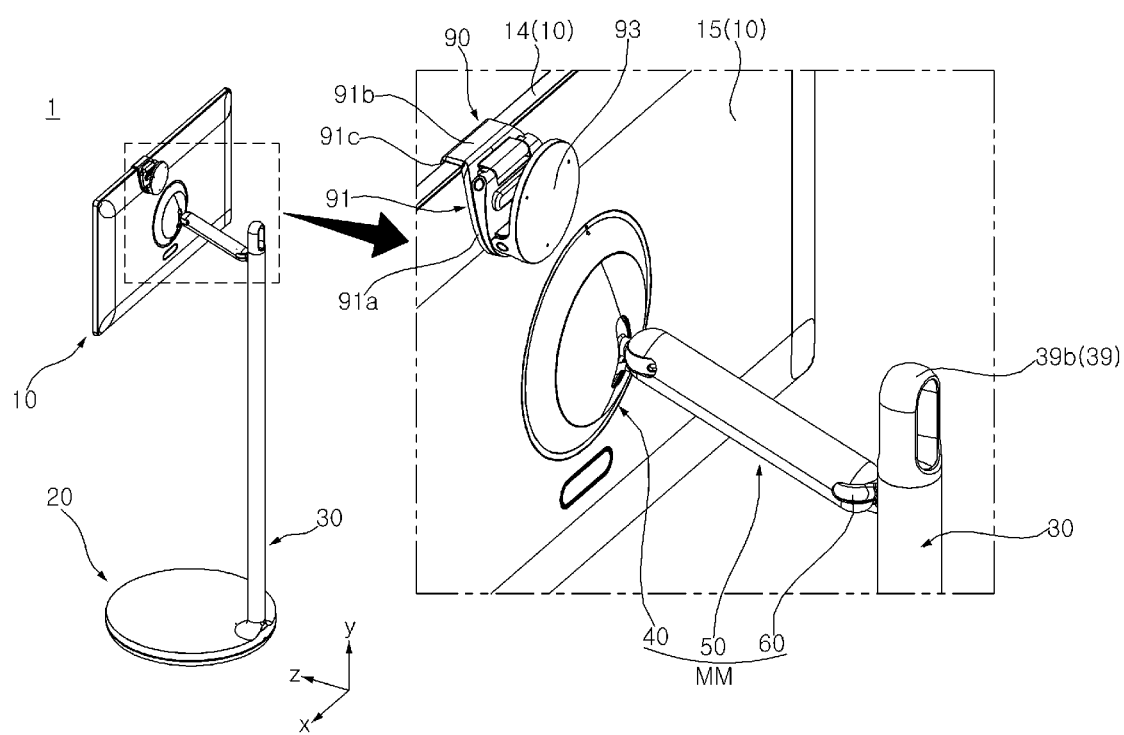

Referring to FIGS. 1 and 2, the display device 1 may include a base 20, a pole 30, and a motion module MM.

The base 20 may have a generally flat cylindrical shape. The base 20 may be placed on the ground.

The pole 30 may be elongated vertically. A lower end of the pole 30 may be coupled onto the base 20. The pole 30 may be adjacent to a circumference of an upper surface of the base 20. A handle 39 may be coupled to an upper end of the pole 30. The pole 30 and the aforementioned base 20 may be collectively referred to as a stand.

The motion module MM may extend in a direction crossing the pole 30. A first side of the motion module MM may be coupled to a rear side of the head 10. A second side of the motion module MM may be adjacent to the upper end of the pole 30 and may be coupled to the pole 30. An articulated connector 40 may be coupled to the rear side of the head 10, an elevating module 60 may be coupled to the pole 30, and an arm 50 may connect the articulated connector 40 and the elevating module 60.

Accordingly, the head 10 may be supported by the motion module MM, the pole 30, and the base 20, and may be spaced upward from the ground.

Figure 3:
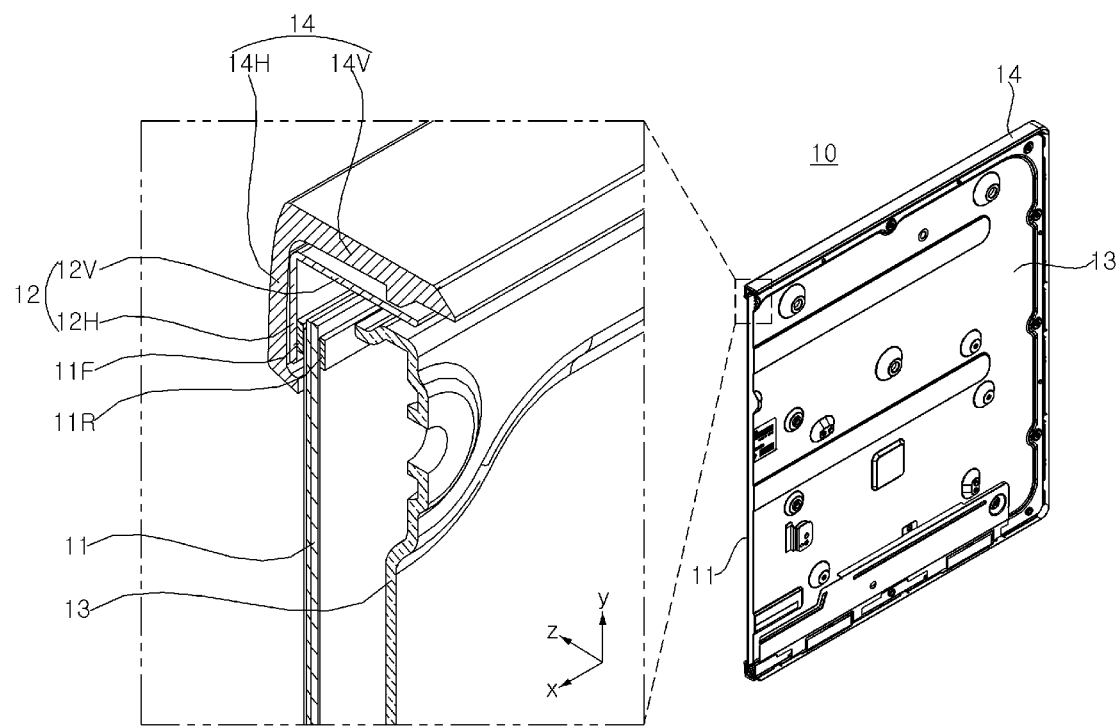

Referring to FIGS. 2 and 3, the head 10 may include a display panel 11, a middle cabinet 12, a frame 13, an end frame 14, and a back cover 15.

The display panel 11 may form a front surface of the head 10. For example, the display panel 11 may be an OLED panel, an LCD panel, or an LED panel. The display panel 11 may divide an image into a plurality of pixels and may output the image while controlling color, brightness, and chroma of the respective pixels. The display panel 11 may be divided into an active area, in which the image is displayed, and a de-active area in which the image is not displayed. The display panel 11 may generate light corresponding to red, green, or blue color in response to a control signal.

The middle cabinet 12 may extend along a periphery of the display panel 11. A horizontal part 12H may be disposed at the front of the display panel 11. A vertical part 12V may intersect the horizontal part 12H and may cover the side of the display panel 11. For example, the middle cabinet 12 may include a metal or plastic material. The middle cabinet 12 may be referred to as a side frame or a guide panel.

The frame 13 may be disposed at the rear of the display panel 11. Electronic components, such as a Printed Circuit Board (PCB), may be coupled to a rear surface of the frame 13. For example, the frame 13 may include a metal material. The frame 13 may be referred to as a mount plate or a module cover.

The end frame 14 may form a periphery of the head 10. A horizontal part 14H may be disposed at the front of the horizontal part 12H of the middle cabinet 12. The vertical part 14V may cover the side of the vertical part 12V of the middle cabinet 12. For example, the end frame 14 may include a metal or plastic material.

The back cover 15 may form a rear surface of the head 10. The back cover 15 may cover the rear of the frame 13 and may be coupled to the frame 13.

Figure 4:
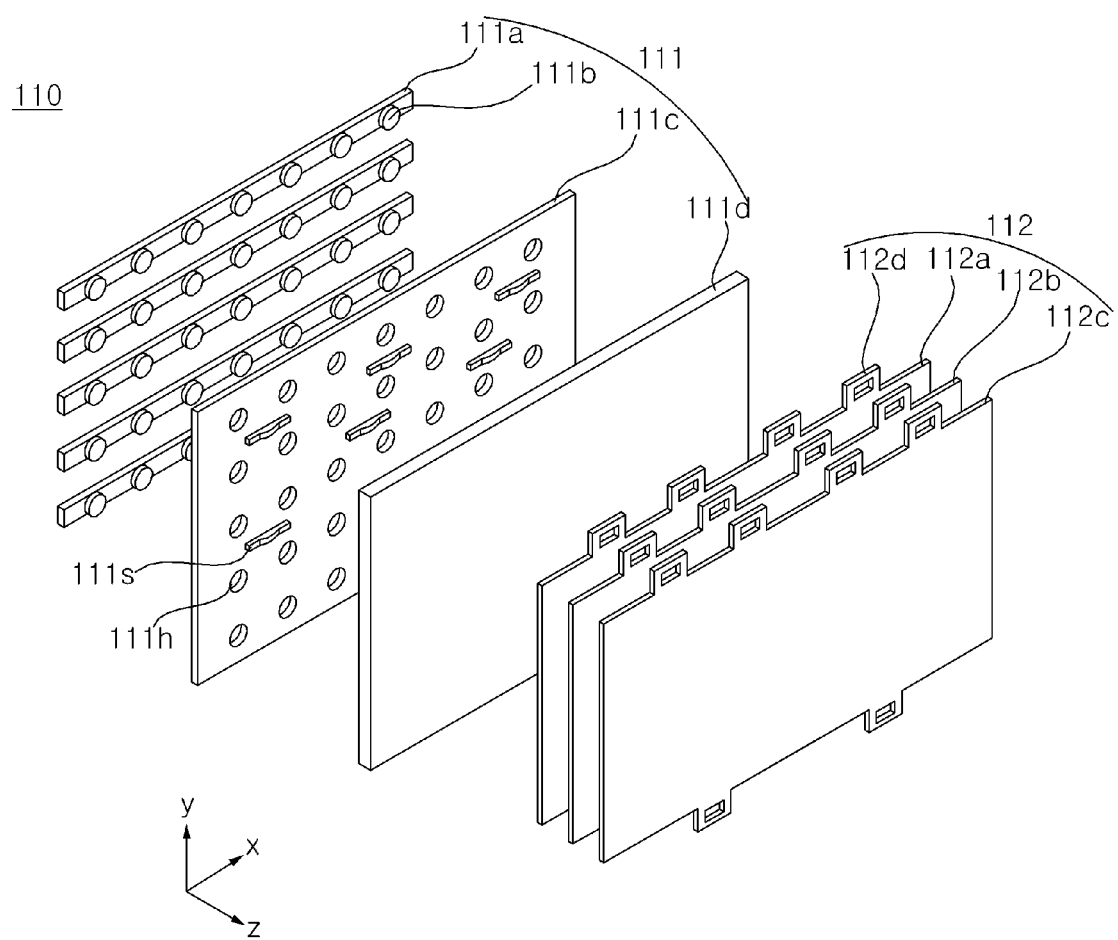

Referring to FIGS. 3 and 4, a backlight unit 110 may be disposed between the display panel 11 and the frame 13 and may be coupled to the frame 13. In this case, the display panel 11 may be referred to as an LCD panel. The backlight unit 110 may include an optical layer 111 and an optical sheet 112. The optical layer 111 may include a substrate 111a, at least one light source 111b, a reflective sheet 111c, and a diffusion plate 111d.

The substrate 111a may be coupled to a front surface of the frame 13. The substrate 111a may have a plate shape or may be formed in the shape of a plurality of straps which are vertically spaced apart from each other. The at least one light source 111b may be mounted on the substrate 111a. For example, the light source 111b may include a light emitting diode (LED). An electrode pattern for connecting the light source 111b to an adapter may be formed on the substrate 111a. The reflective sheet 111c may be disposed at the front of the substrate 111a. The reflective sheet 111c may have a hole 111h in which the light source 111b is disposed. The diffusion plate 111d may be disposed at the front of the reflective sheet 111c. A spacer 111s may support a rear surface of the diffusion plate 111d at a position between the reflective sheet 111c and the diffusion plate 111d.

The optical sheet 112 may be disposed at the front of the diffusion plate 111d. A rear surface of the optical sheet 112 may come into close contact with the diffusion plate 111d, and a front surface of the optical sheet 112 may come into close contact with or may be adjacent to the rear surface of the display panel 11. The optical sheet 112 may include at least either a diffusion sheet or a prism sheet. A coupling part 112d may be formed on at least one edge of the optical sheet 112.

Accordingly, light from the light source 111b may be provided to the display panel 11 via the diffusion plate 111d and the optical sheet 112. The display panel 11 of the present disclosure may be an OLED panel requiring no backlight unit 110 described above or may be another type of panel.

Figure 5:
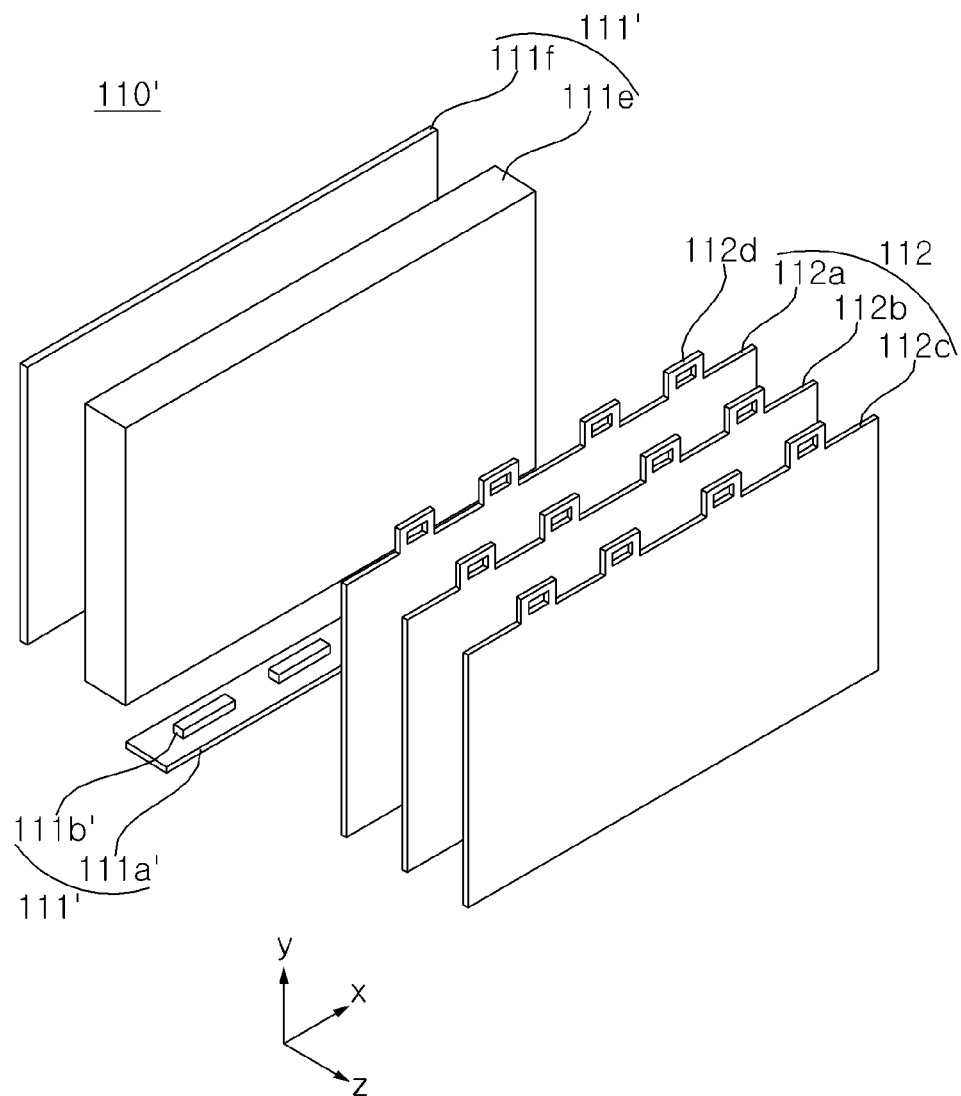

Referring to FIGS. 3 and 5, a backlight unit 110' may be disposed between the display panel 11 and the frame 13 and may be coupled to the frame 13. In this case, the display panel 11 may be referred to as an LCD panel. The backlight unit 110' may include an optical layer 111' and an optical sheet 112. The optical sheet 111' may include a substrate 111a', at least one light source 111b', a reflective sheet 111f, and a light guide plate 111e. The light guide plate 111e may be disposed between the frame 13 and the optical sheet 112 and may be supported by the frame 13.

The substrate 111a' may be adjacent to a periphery of the light guide plate 111e and may be coupled to the frame 13. The at least one light source 111b' may be mounted on the substrate 111a'. For example, the light source 111b' may include a light emitting diode (LED). An electrode pattern for connecting the light source 111b' to an adapter may be formed on the substrate 111a'. The reflective sheet 111f may be disposed between the frame 13 and the light guide plate 111e and may be supported by the frame 13.

Accordingly, light from the light source 111b' may be provided to the display panel 11 via the diffusion plate 111e and the optical sheet 112. The display panel 11 of the present disclosure may be an OLED panel requiring no backlight unit 110' described above or may be another type of panel.

Figure 6:
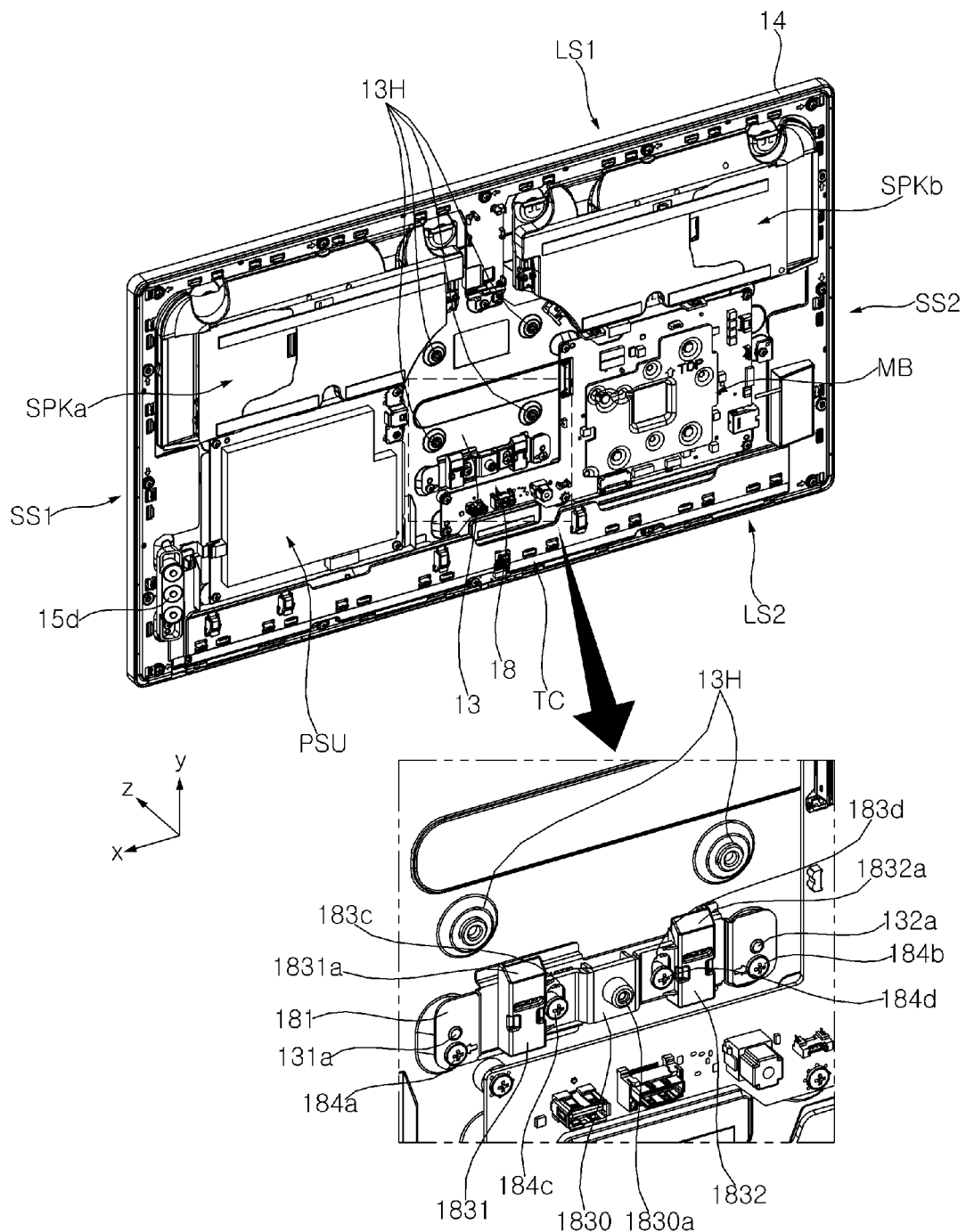

Referring to FIG. 6, electronic components may be mounted on the rear surface of the frame 13 and may include a plurality of boards PSU, MB, and TC and speakers SPKa and SPKb.

A power supply board PSU may be disposed closer to the first short side SS1 than to the second short side SS2 and may be coupled to the rear surface of the frame 13. The power supply board PSU may supply power to the respective components of the display device. For example, the power supply board PSU may supply power to the light sources 111b and 111b' of the backlight units 110 and 110' (see FIGS. 4 and 5). The power supply board PSU may be referred to as an LED driver.

The main board MB may be disposed closer to the second short side SS2 than to the first short side SS1 and may be coupled to the rear surface of the frame 13. The main board MB may control the display device.

The timing controller board TC may be disposed below the power supply board PSU and the main board MB and may be coupled to the rear surface of the frame 13. The timing controller board TC may be electrically connected to the display panel 11 (see FIG. 3) through a cable (not shown) and may provide an image signal to the display panel 11.

The speakers SPKa and SPKb may be disposed above the plurality of boards PSU, MB, and TC and may be coupled to the rear surface of the frame 13. For example, a left speaker SPKa may be disposed closer to the first short side SS1 than to the second short side SS2 and may direct sound in a lateral direction. For example, a right speaker SPKb may be disposed closer to the second short side SS2 than to the first short side SS1 And may laterally direct sound.

A locking unit 18 may be coupled to the rear surface of the frame 13. The locking unit 18 may be disposed below the center of the frame 13.

Figure 7:
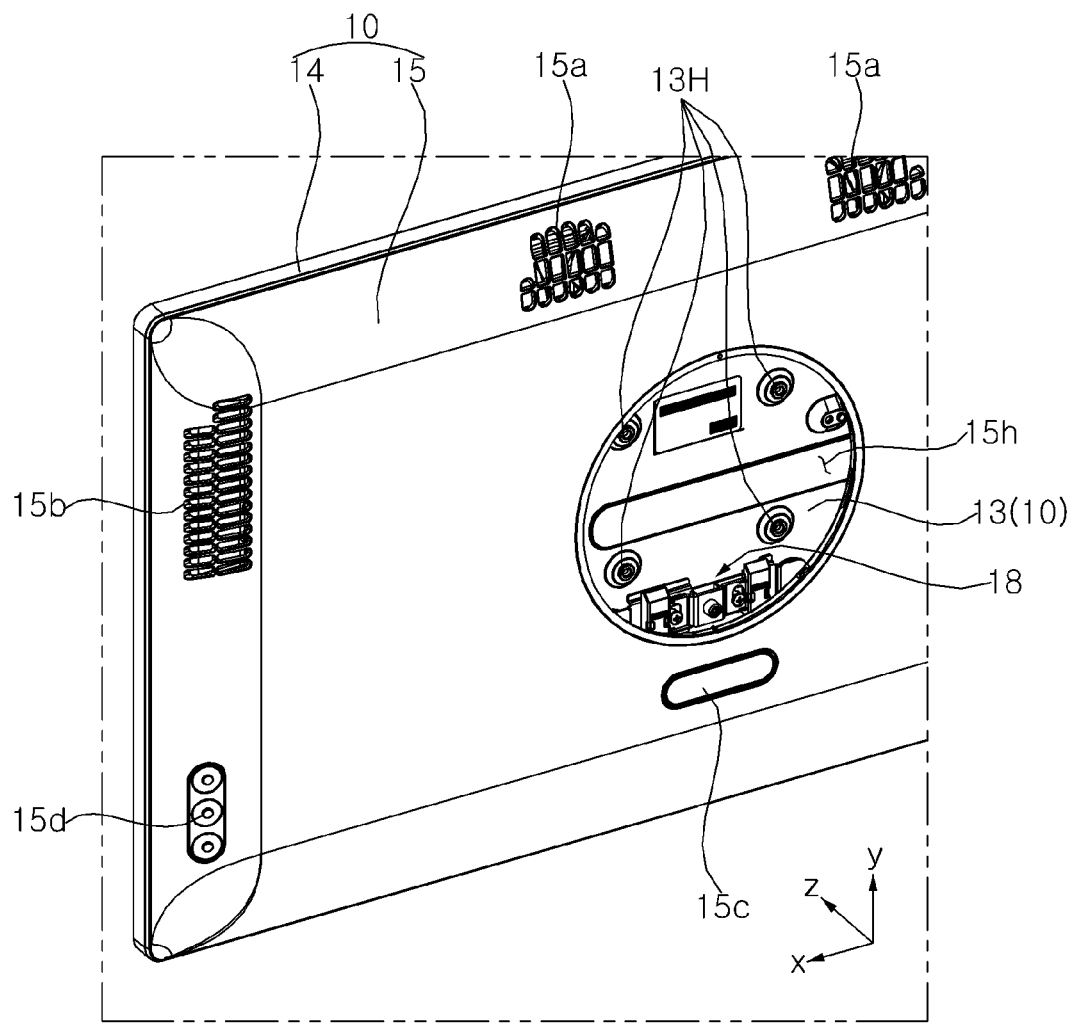

Referring to FIG. 7, the back cover 15 may cover the rear of the frame 13 and may be coupled to the frame 13. Positions of speaker holes 15a and 15b formed in the back cover 15 may correspond to positions of the speakers SPKa and SPKb (see FIG. 6) mounted to the frame 13.

Fixing parts 13H may protrude rearward from the rear surface of the frame 13. The fixing parts 13H may be PEM nuts. The fixing parts 13H and the locking unit 18 may be exposed to the outside through a hole 15h formed at the center of the back cover 15.

Figure 8:
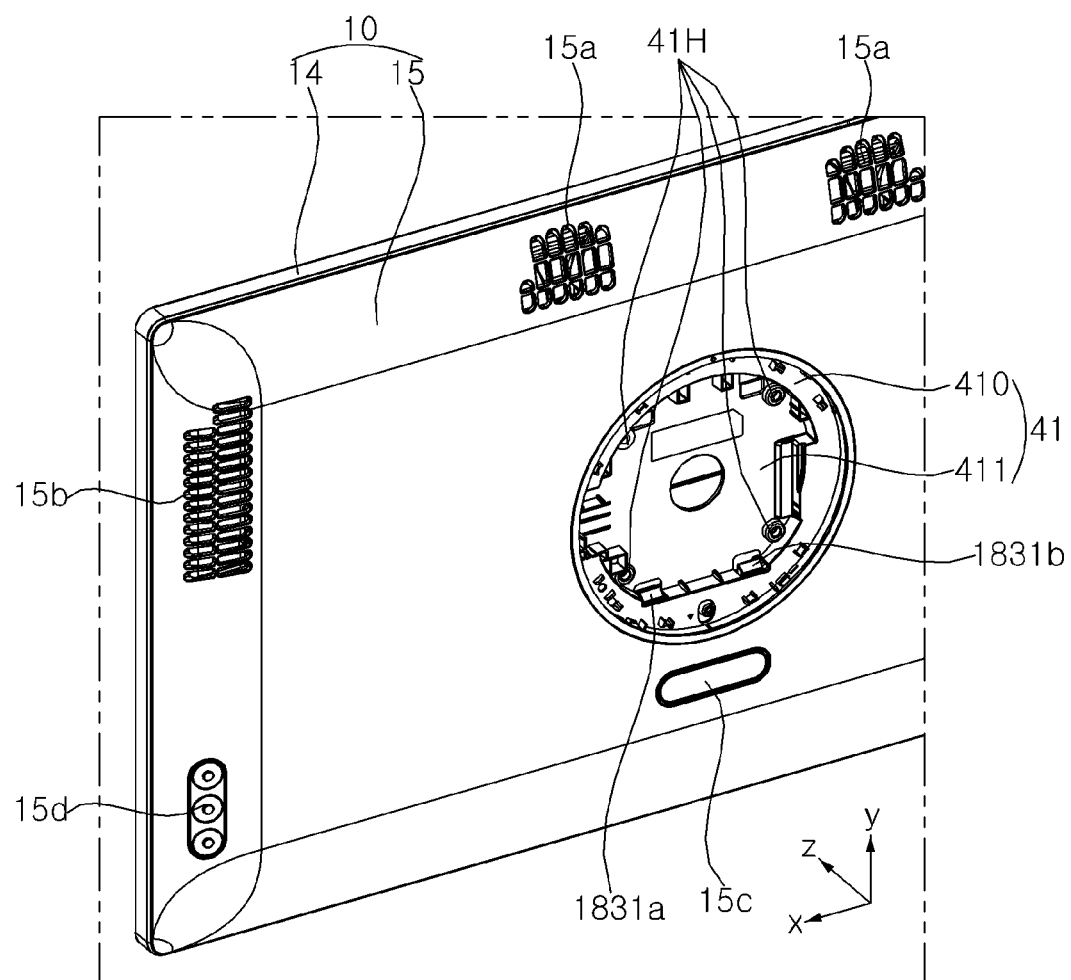

Referring to FIGS. 7 and 8, a fixing plate 41 may have a circular plate shape corresponding to the hole 15h of the back cover 15.

Fixing holes 41H may be formed in the fixing plate 41 and may be aligned with the fixing parts 13H. A fastening member (not shown), such as a screw, may be fastened to the fixing parts 13H through the fixing holes 41H. Accordingly, the fixing plate 41 may be coupled to the frame 13.

Figure 9:
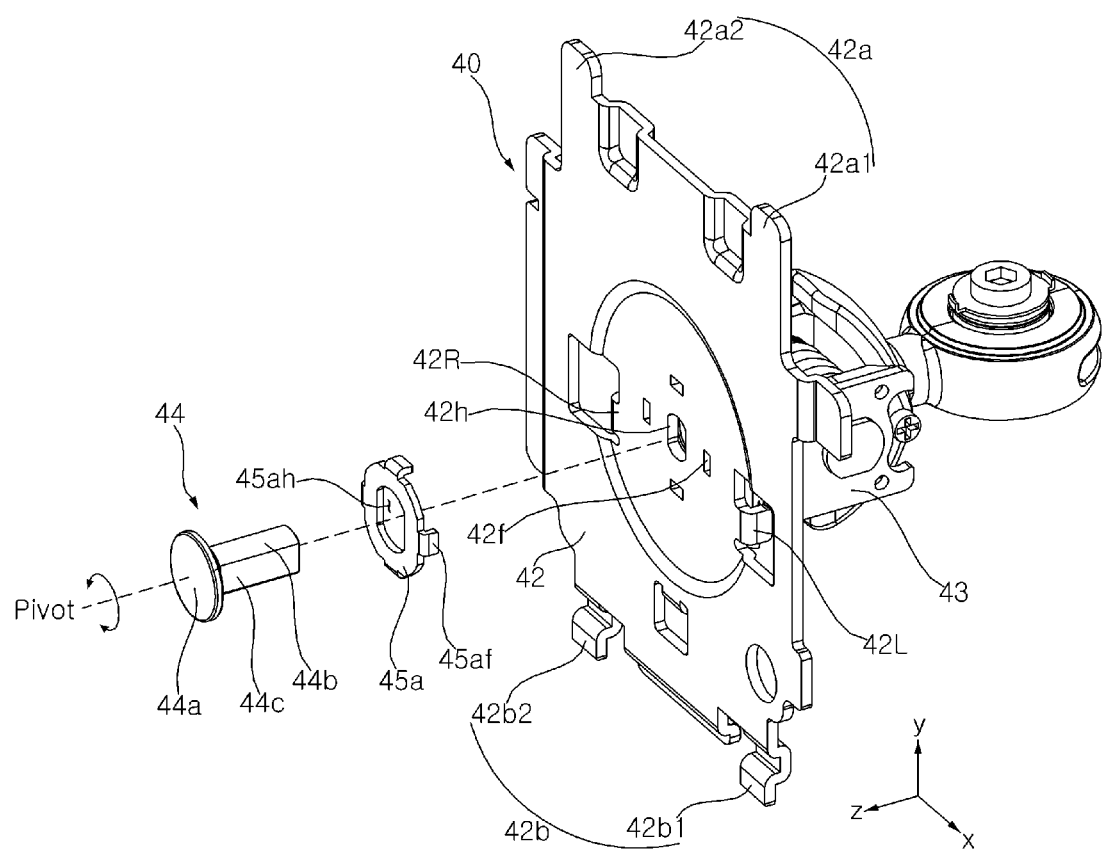

Referring to FIGS. 8 and 9, a front bracket 42 of the articulated connector 40 may be disposed at the rear of the fixing plate 41 and may have a generally plate shape. A pair of top protrusions 42a1 and 42a2 may protrude upward from an upper side of the front bracket 42 and may be spaced apart from each other in the left-right direction. A pair of bottom protrusions 42b1 and 42b2 may protrude downward from a lower side of the front bracket 42 and may be spaced apart from each other in the left-right direction. The pair of bottom protrusions 42b1 and 42b2 may be engaged with a pair of engaging portions 1831a and 1831b of the locking unit 18 passing through the fixing plate 41, and the pair of top protrusions 42a1 and 42a2 may be inserted and coupled to a pair of holes formed in an upper portion of the fixing plate 41. Accordingly, the front bracket 42 may be removably coupled to the fixing plate 41.

A pivot shaft 44 may extend in the front-rear direction. A diameter of a head 44a of the pivot shaft 44 may be greater than a diameter of a body 44b. A pair of cut-outs 44c may be formed in a lateral surface of the body 44b and may face each other. The front bracket 42 may have a hole 42h which is formed at the center thereof, and through which the body 44b may pass. The hole 42h of the front bracket 42 may have the same shape as a shape of a longitudinal section of the body 44b. Accordingly, the pivot shaft 44 and the front bracket 42 may rotate together in an axial direction.

A front grab 45a may be disposed between the head 44a and a front surface of the front bracket 42. A hole 45ah of the front grab 45a may be aligned with the hole 42h of the front bracket 42 and may have the same shape as the hole 42h. The body 44b may pass through the holes 45ah and 42h. The front grab 45a may be fixed to the front bracket 42. That is, the front grab 45a may rotate together with the pivot shaft 44 and the front bracket 42.

Figure 10:
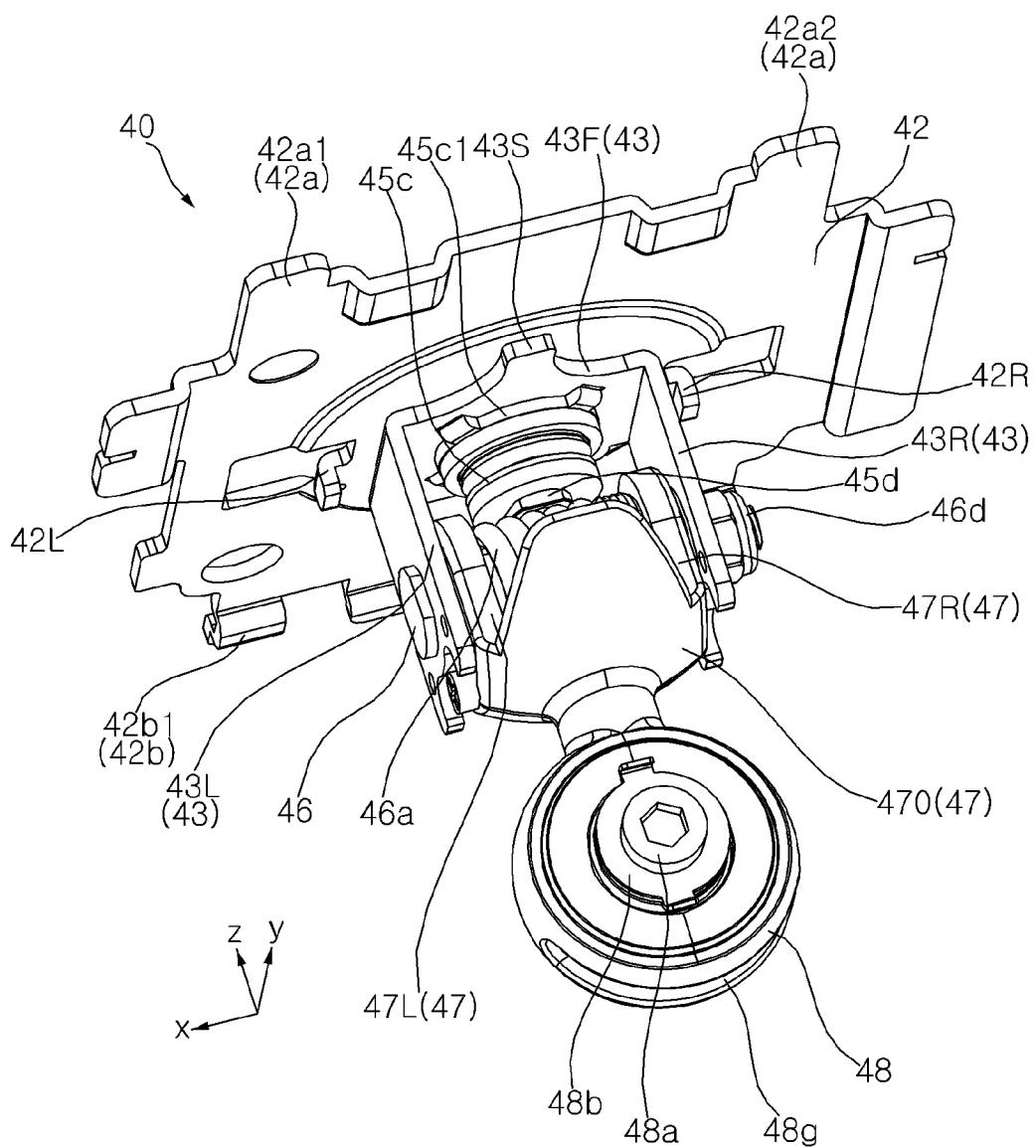
Figure 11:
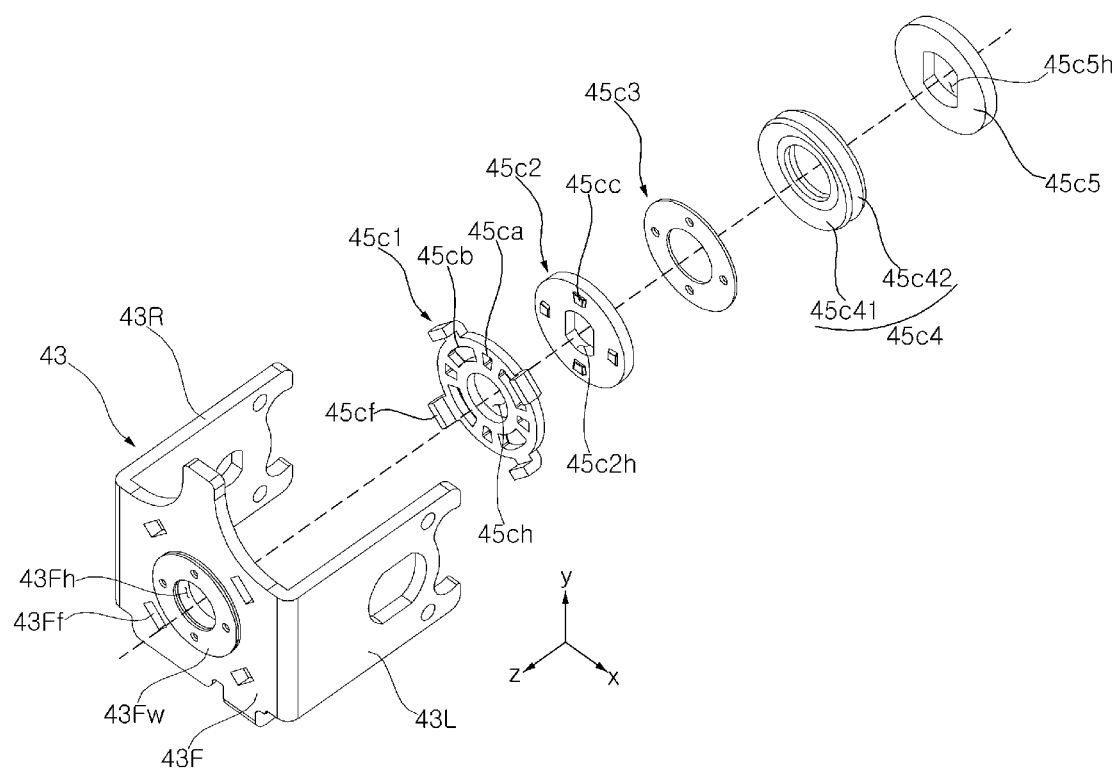

Referring to FIGS. 10 and 11, a rear bracket 43 may be disposed at the rear of the front bracket 42. The rear bracket 43 may include a mount 43F, a left wing 43L, and a right wing 43R.

The mount 43F may face the front bracket 42 and may have a circular mount hole 43Fh. At least one washer 43Fw may be disposed between the front bracket 42 and the mount 43F and may have a circular hole. The body 44d of the pivot shaft 44 may pass through the hole of the washer 43Fw and the mount hole 43Fh and may rotate independently of the washer 43Fw and the mount 43F.

The left wing 43L may extend rearward from a left side of the mount 43F. The right wing 43R may extend rearward from a right side of the mount 43F. A plurality of members 45c: 45c1, 45c2, 45c3, 45c4, and 45c5, which will be described below, may be coupled to the mount 43F at positions between the left wing 43L and the right wing 43R.

A rear grab 45c1 may be disposed opposite the washer 43Fw with respect to the mount 43F and may have a circular hole 45ch through which the body 44b of the pivot shaft 44 passes. The rear grab 45c1 may be fixed to a rear surface of the mount 43F.

Further, a plurality of fixing holes 45ca and a plurality of slots 45cb may be formed in the rear grab 45c1 and may be spaced apart from each other in a circumferential direction of the rear grab 45c1. The plurality of fixing holes 45ca and the plurality of slots 45cb may be arranged alternately in a circumferential direction of the rear grab 45c1. For example, the fixing holes 45ca or the slots 45cb may be spaced apart from each other at 90-degree intervals. A length of the slot 45cb may be greater than a length of the fixing hole 45ca in the circumferential direction of the rear grab 45c1.

A disc 45c2 may be disposed at the rear of the rear grab 45c1 and may have a hole 45c2h through which the body 44b passes and which has the same shape as the longitudinal section of the body 44b. A plurality of bosses 45cc may protrude from a front surface of the disc 45c2 toward the rear grab 45c1 and may be spaced apart from each other in a circumferential direction of the disc 45c2. For example, the bosses 45cc may be spaced apart from each other at 90-degree intervals. A size of the boss 45cc may be equal to a size of the fixing hole 45ca or may correspond thereto. That is, when the boss 45cc is inserted into the fixing hole 45ca, rotation of the disc 45c2 and the pivot shaft 44 may be limited to some degree by the rear grab 45c1. In addition, when the boss 45cc is inserted into the slot 45cb, the disc 45c2 and the pivot shaft 44 may rotate within a trajectory of the slot 45cb.

The washer 45c3 may be disposed at the rear of the disc 45c2 and may have a circular hole (not numbered) through which the body 44b of the pivot shaft 44 passes.

A disc spring 45c4 may be disposed opposite the disc 45c2 with respect to the washer 45c3 and may have a circular hole (not numbered) through which the body 44b of the pivot shaft 44 passes. The disc spring 45c4 may have elasticity and may be convex forward or rearward. The disc spring 45c4 may generate an elastic force in the axial direction.

A cap 45c5 may be disposed at the rear of the disc spring 45c4 and may have a hole 45c5h through which the body 44b of the pivot shaft 44 passes. The hole 45c5h may have the same shape as a shape of the longitudinal section of the body 44b. The cap 45c5 may be fixed to an end of the body 44b.

Accordingly, the pivot shaft 44 may rotate together with the front bracket 42, the front grab 45a, the disc 45c2, and the cap 45c5. In addition, the pivot shaft 45 may rotate independently of the washer 43Fw, the rear bracket 43, the rear grab 45c1, the washer 45c3, and the disc spring 45c4. In other words, even when the pivot shaft 45 rotates, the washer 43Fw, the rear bracket 43, the rear grab 45c1, the washer 45c3, and the disc spring 45c4 may not rotate.

Further, a user may pivot the head 10 (see FIG. 8), fixed to the front bracket 42, about the pivot shaft 44. For example, the head 10 may pivot within a range of +90 degrees to −90 degrees. Also, unless an external force at a certain level or higher is applied, the elastic force of the disc spring 45c41 and 45c2 may allow the head 10 to be maintained at a constant pivot angle. In addition, during a pivot motion of the head 10, the user may feel the sense of coupling when the boss 45cc is inserted into the fixing hole 45ca or the slot 45cb. That is, when the boss 45cc moves out of the slot 45 to be inserted into the fixing hole 45ca, the user may feel that the head 10 is positioned at a pivot angle of zero degrees or +90 or −90 degrees.

Figure 12:
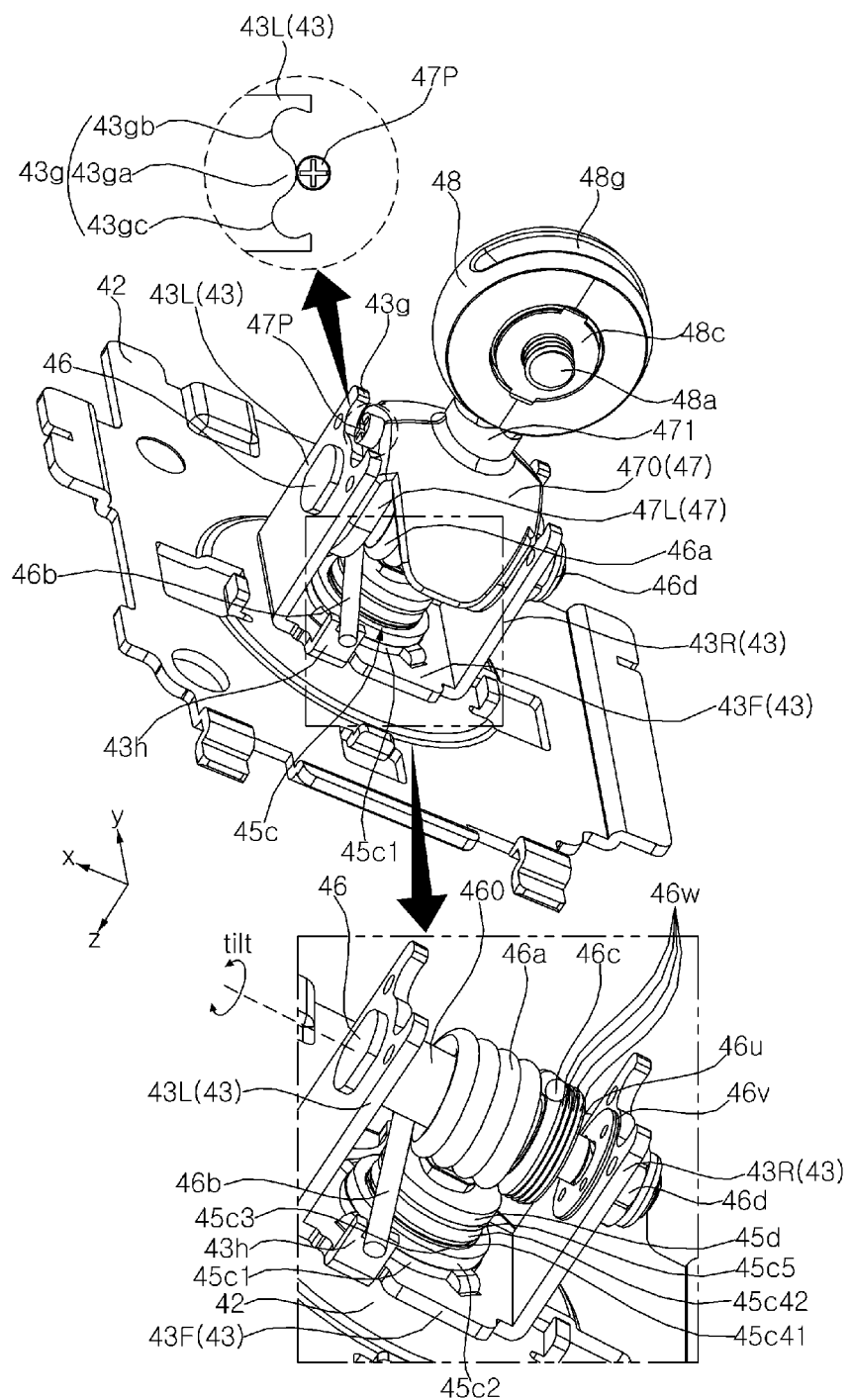

Referring to FIG. 12, a holder 47 may be disposed between the left wing 43L and the right wing 43R. A holder body 470 may cover the rear of the mount 43F of the rear bracket 43. A first part 47L may protrude toward the mount 43F from a left part of the holder body 470 and may be adjacent to the left wing 43L. A second part 47R (see FIG. 10) may protrude toward the mount 43F from a right part of the holder body 47 and may be adjacent to the right wing 43R.

A tilt shaft 46 may extend in the left-right direction. The tilt shaft 46 may pass through the left wing 43L, the first part 47L, the second part 47R, and the right wing 43R. A head (not numbered), which is a first end of the tilt shaft 46, may be seated on a side surface of the left wing 43L. A screw thread may be formed at a second end of the tilt shaft 46, and a fastening member 46d, such as a nut, may be fastened to the second end of the tilt shaft 46 on the right wing 43R.

In addition, the tilt shaft 46 may have a generally cylindrical shape and may be fixed to the left wing 43L and the right wing 43R. The tilt shaft 46 may be rotatably coupled to the holder 47. That is, the tilt shaft 46 may provide a tilt axis. At least one washer 46v may be disposed between the second part 47R and the right wing 43R and may have a circular hole through which the tilt shaft 46 passes.

An elastic member 46a may be disposed between the left wing 43L and the right wing 43R. The elastic member 46a may be wound a plurality of times around an outer circumference of the tilt shaft 46 and may have elasticity. The elastic member 46a may be a coil-shaped spring.

Further, a portion 46b of the elastic member 46a may extend in a direction intersecting the tilt shaft 46 without being wound around the tilt shaft 46. The portion 46b of the elastic member 46a may be stopped by a seating part 43h which protrudes rearward from the mount 43F.

In addition, a first end of the elastic member 46a may be formed on the portion 46b, and a second end of the elastic member 46a may be fixed to the inside of the holder 47. A disc spring 46w may be adjacent to a second end 46c of the elastic member 46a and may be disposed between the elastic member 46a and the second part 47R. The disc spring 46w may have a circular hole (not numbered) through which the tilt shaft 46 passes. The disc spring 46w may be convex toward the elastic member 46a and may generate an elastic force in an axial direction of the tilt shaft 46.

Accordingly, the tilt shaft 46 may rotate together with the rear bracket 43, the front bracket 42, and the plurality of members 45c5, 45c4, 45c3, 45c2, 45c1, 43Fw, 45a, and 44. In response to the rotation of the tilt shaft 46, the head 10 (see FIG. 8) fixed to the front bracket 42 may be tilted upward or downward. For example, the head 10 may be tilted within a range of +25 degrees to −25 degrees. In addition, unless an external force at a certain level or higher is applied, the elastic force of the elastic member 46a and the disc spring 46w may allow the head 10 to be maintained at a constant tilt angle.

Figure 13:
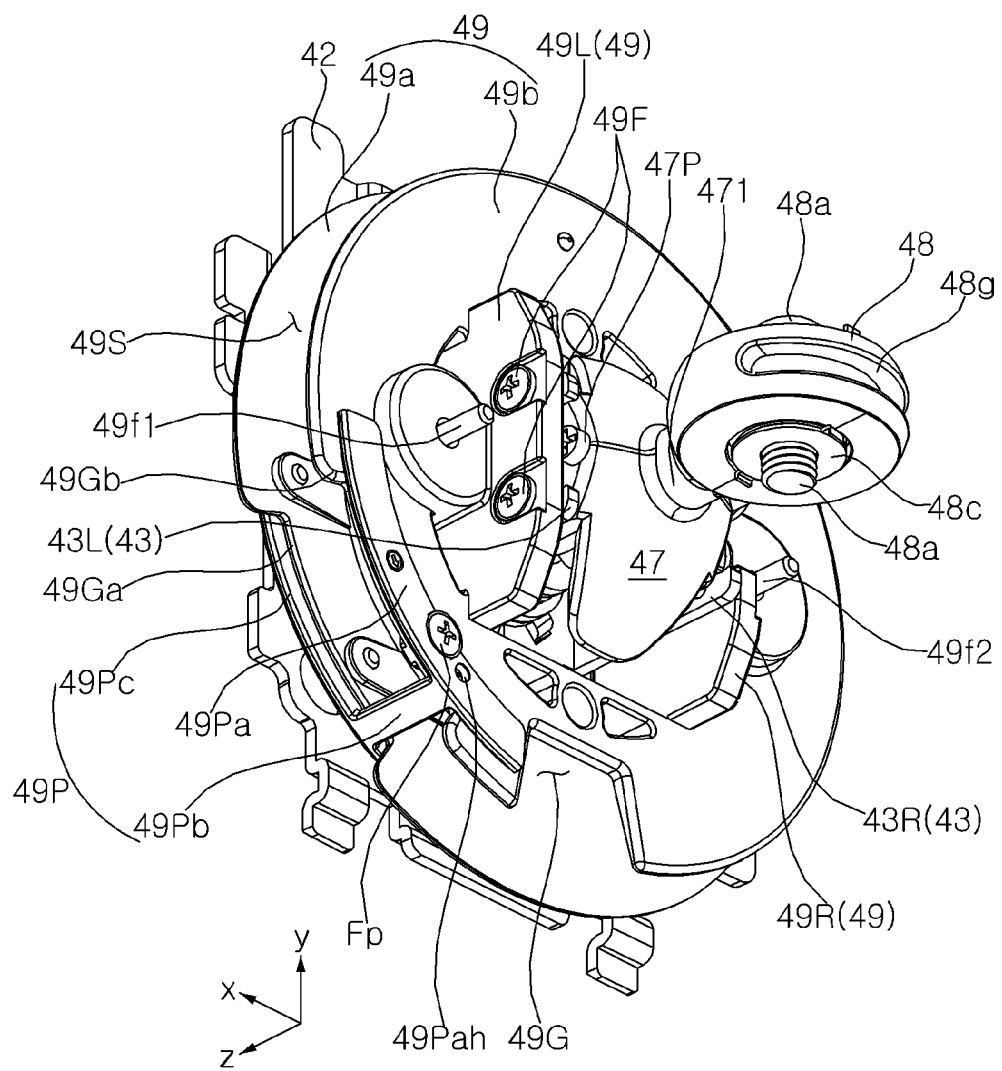
Figure 14:
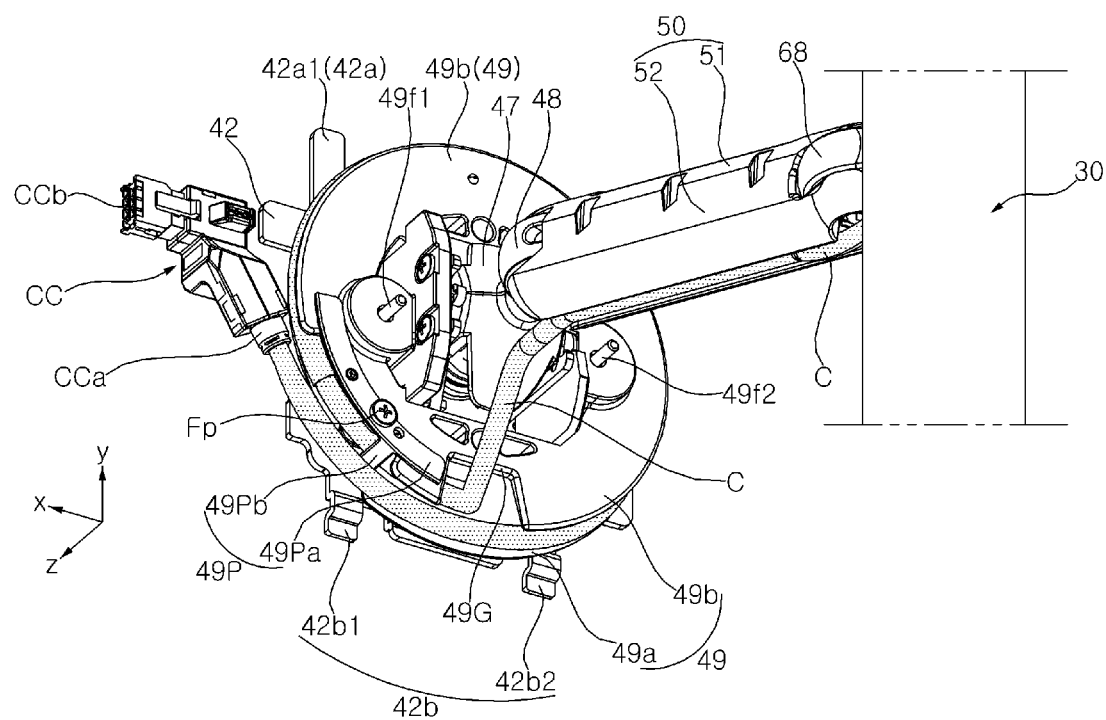

Referring to FIGS. 13 and 14, a first rotation unit 48 may be disposed at the rear of the holder 47. A first connecting part 471 may connect the holder 47 and the first rotation unit 48. For example, the holder 47, the first connecting part 471, and the first rotation unit 48 may be formed as one body.

A cable reel 49 may be disposed at the rear the front bracket 42. The cable reel 49 may be coupled to the left wing 43L and the right wing 43R via a fastening member 49F such as a screw.

The rear bracket 43 and the holder 47 may be disposed in an inner space of a hollow cylinder-shaped reel body (not shown) of the cable reel 49. A first plate 49a and a second plate 49b of the cable reel 49 may protrude from a front end and a rear end, respectively, of the reel body in a radial direction of the reel body and may extend along an outer circumference of the reel body. That is, each of the first plate 49a and the second plate 49b may have a generally ring shape. Accordingly, a cable C may be wound around the reel body of the cable reel 49 at a position between the first plate 49 and the second plate 49b.

Figure 15:
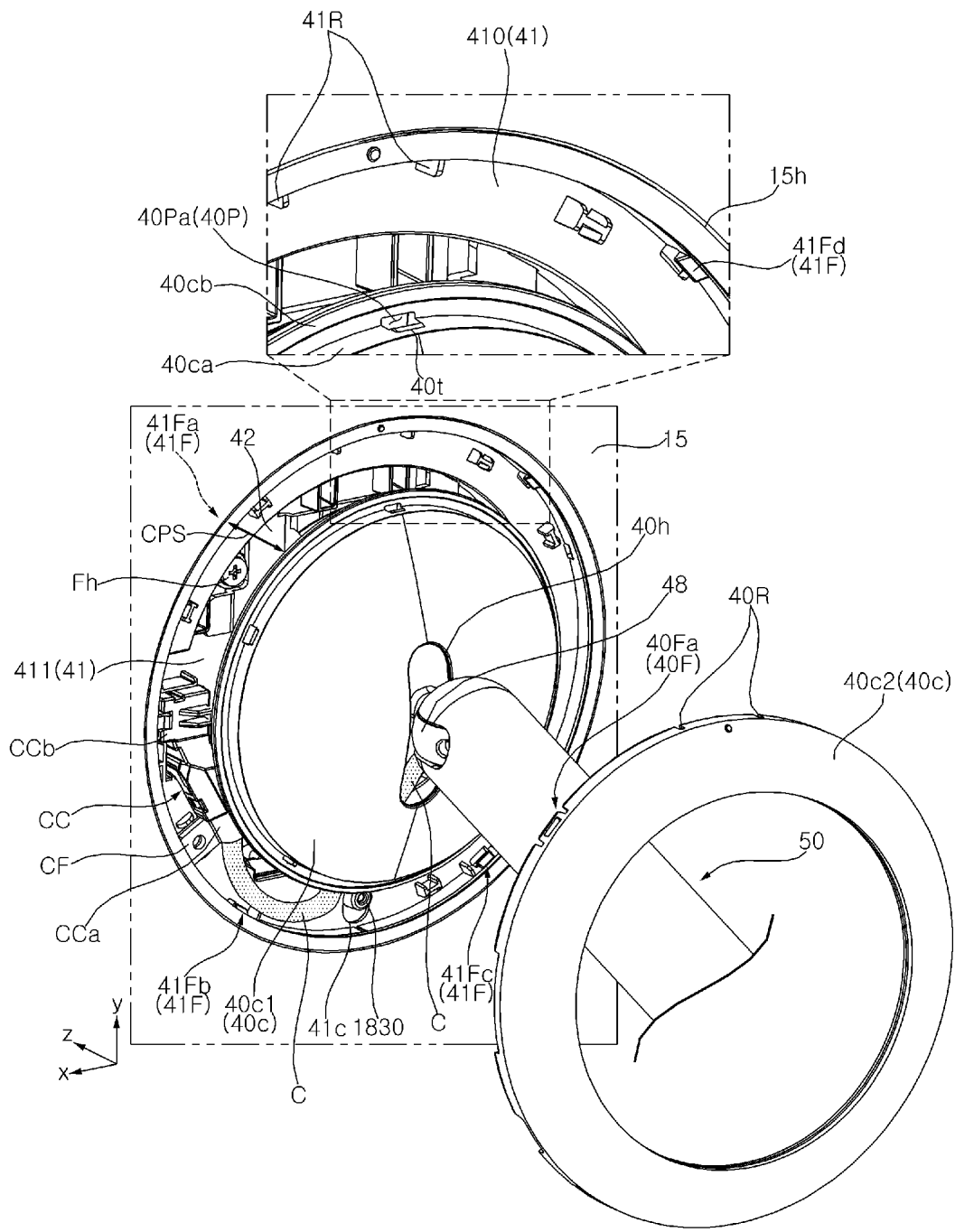

Referring to FIGS. 14 and 15, the front bracket 42 may be removably coupled to the fixing plate 41 (see FIG. 8).

An inner cover 40c1 may cover the rear of the cable reel 49 and may have a cover hole 40h through which the first rotation unit 48 passes. Fastening members 49f1 and 49f2 may pass through the cable reel 49 to protrude rearward and may be coupled to the inside of the inner cover 40c1. For example, the fastening members 49f1 and 49f2 may be screws or bolts.

An inner circumference of an outer cover 40c2 may be coupled to an outer circumference of the inner cover 40c1. The inner cover 40c1 and the outer cover 40c2 may cover the rear of the hole 15h of the back cover 15.

Figure 16:
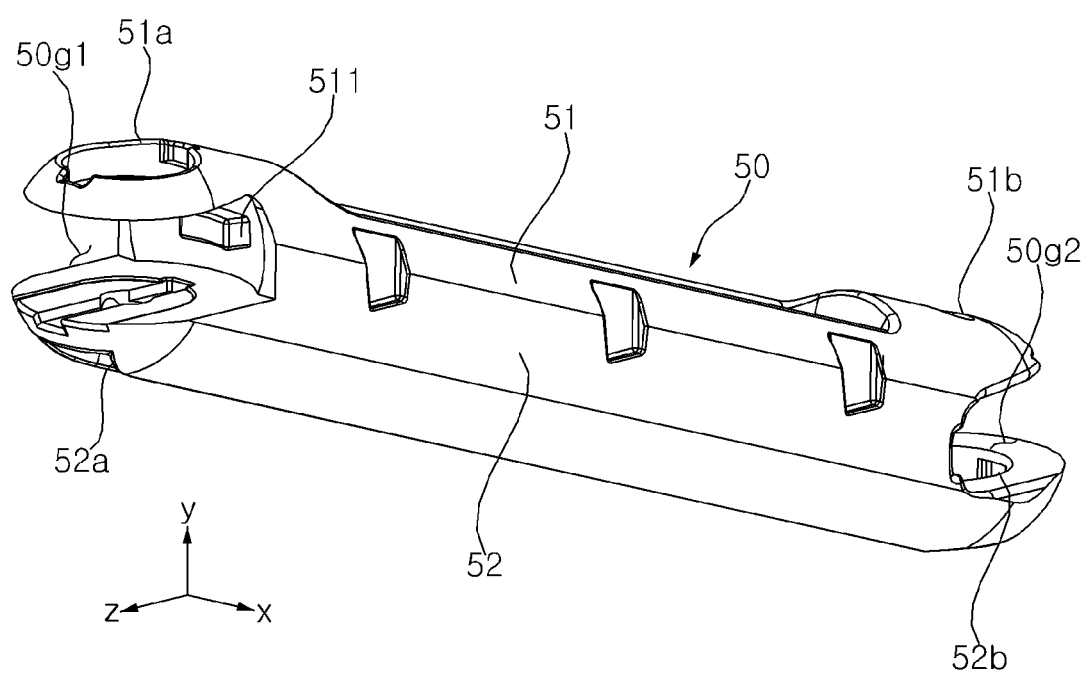
Figure 17:
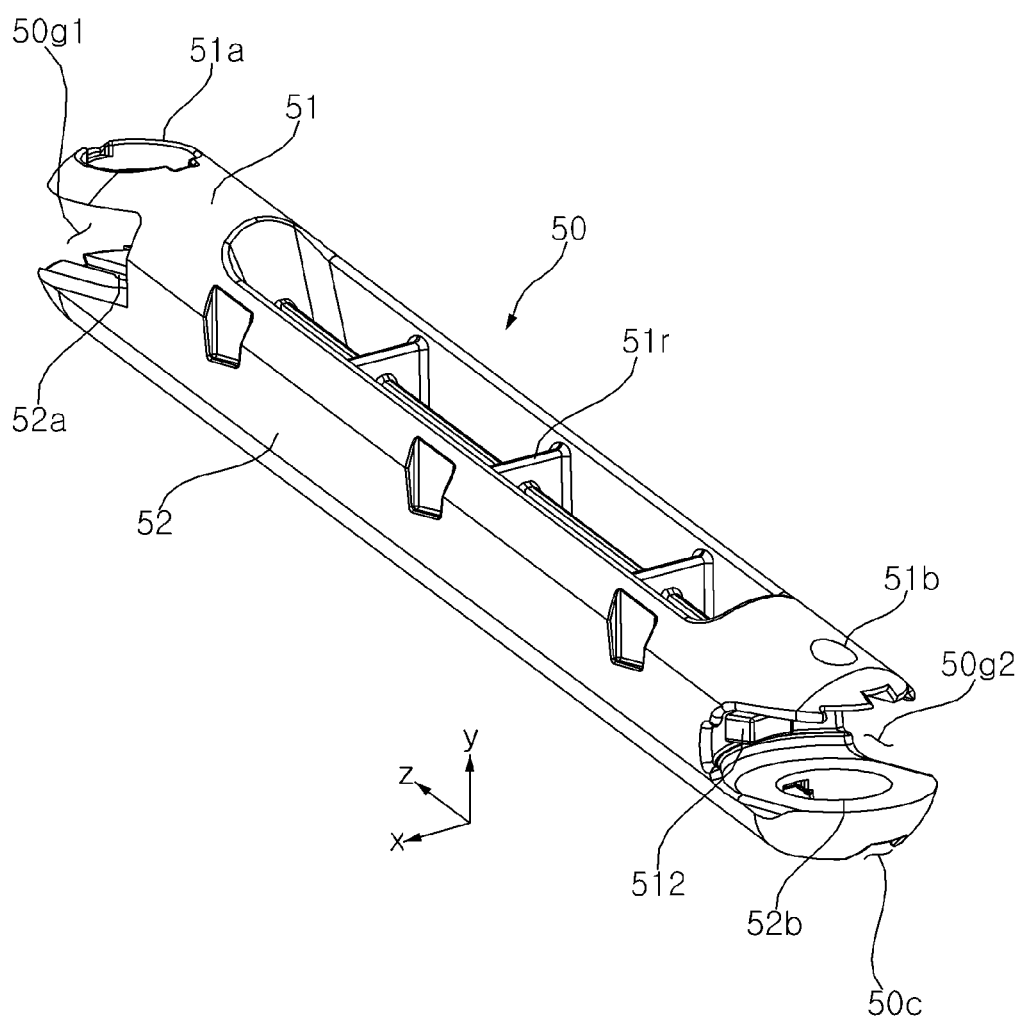

Referring to FIGS. 16 and 17, the arm 50 may include arm bodies 51 and 52. An upper arm body 51 and a lower arm body 52 may be coupled to each other. The arm 50 may be referred to as a rod 50 or a link 50.

A front portion of the upper arm body 51 may be spaced upward from a front portion of the lower arm body 52. A front groove 50g1 may be formed in the front portions of the arm bodies 51 and 52 and may have a "U" shape that is open forwardly. A rear portion of the upper arm body 51 may be spaced upward from a rear portion of the lower arm body 52. A rear groove 50g2 may be formed in the rear portions of the arm bodies 51 and 52 and may have a "U" shape that is open rearwardly.

An upper insertion hole 51a may be formed by vertically passing through the front portion of the upper arm body 51 and may face the front groove 50g1. An upper fastening hole 51b may be formed by vertically passing through the rear portion of the upper arm body 51 and may face the rear groove 50g2.

A lower fastening hole 52a may be formed by vertically passing through the front portion of the lower arm body 52 and may be aligned with the upper insertion hole 51a. A lower insertion hole 52b may be formed by vertically passing through the rear portion of the lower arm body 52 and may be aligned with the upper fastening hole 51b.

A cable groove 50c may be formed in a lower surface of the lower arm body 52 and may extend in a longitudinal direction of the lower arm body 52. The cable C (see FIG. 14) may be placed in the cable groove 50c.

Figure 18:
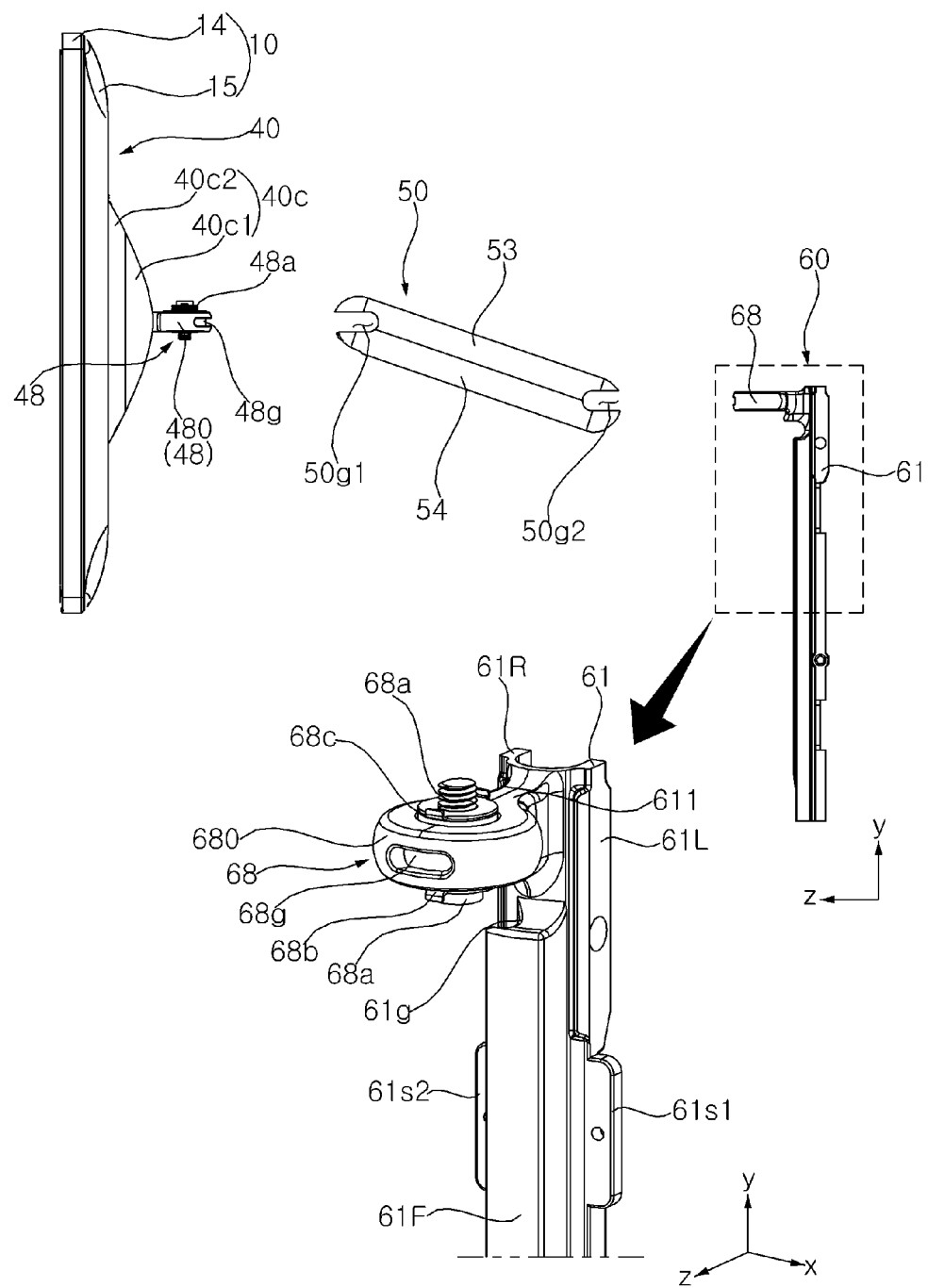

Referring to FIG. 18, an upper cover 53 may cover a surface of the upper arm body 51 (see FIG. 17). A lower cover 54 may cover a surface of the lower arm body 52 (see FIG. 17). The upper cover 53 and the lower cover 54 may be separately formed or may be formed as one body.

The first rotation unit 48 may be inserted into the front groove 50g1 and may be rotatably coupled to the arm 50. A second rotation unit 68 may be inserted into the rear groove 50g2 and may be rotatably coupled to the arm 50. The second rotation unit 68 may protrude toward the rear groove 50g2 from a vertical member 61 which will be described later.

Figure 19:
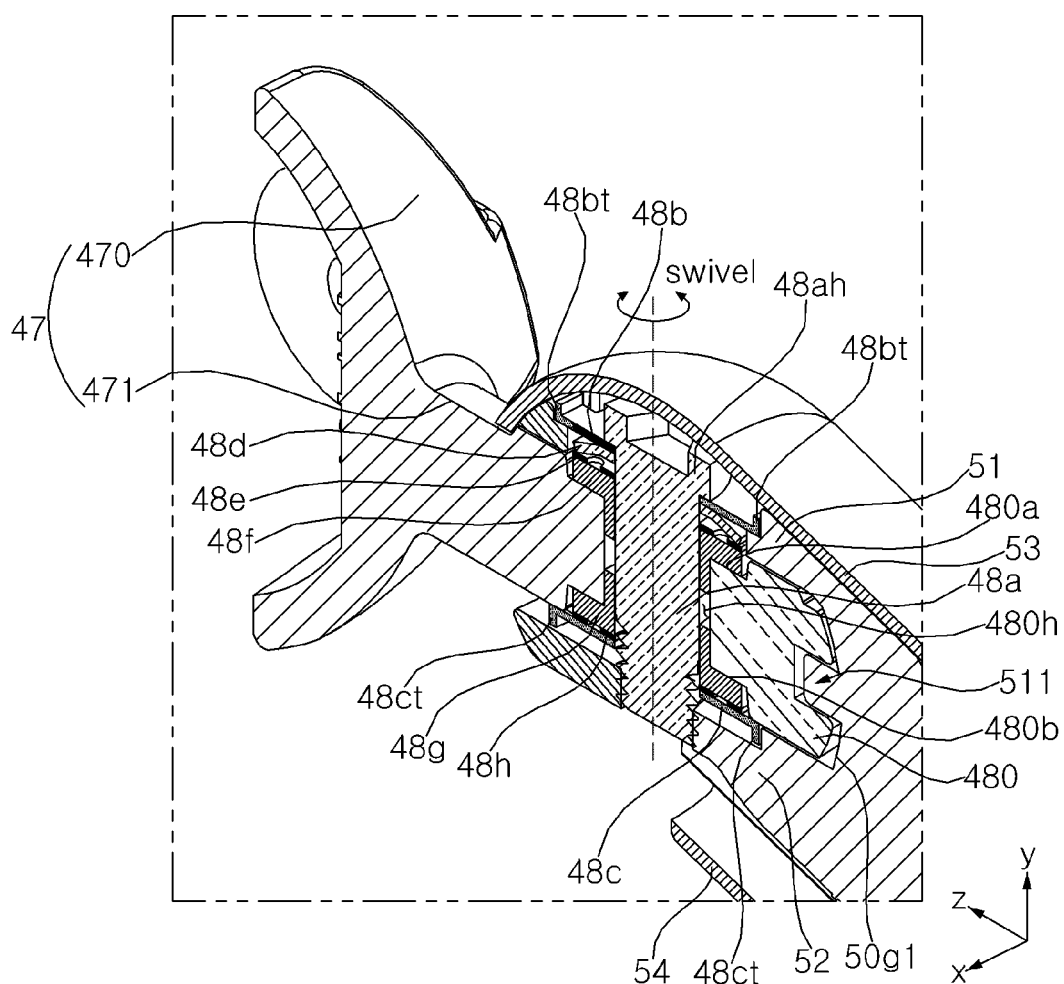

Referring to FIGS. 18 and 19, the first rotation unit 48 may include a first body 480, a first fastening member 48a, a first upper lock washer 48b, a first disc spring 48d, a first upper washer 48e, a first upper bushing 48f, a first lower bushing 48g, a first lower washer 48h, and a first lower lock washer 48c. The first rotation unit 48 may be referred to as a first swivel unit 48 or a first swivel module 48.

The first body 480 may be open at the top and bottom. The first body 480 may have a substantially donut shape. For example, the first body 480 may be formed as one body with the first connecting part 471. The first body 480 may be inserted into the front groove 50g1.

The first fastening member 48a may extend vertically. The first fastening member 48a may be inserted into the arm 50 through the upper insertion hole 51a (see FIG. 17) and may pass through a hole 480h formed at the center of the first body 480. A head 48ah of the first fastening member 48a may be disposed inside the upper arm body 51. The first fastening member 48a may be screwed into the lower fastening hole 52a (see FIG. 17).

The first upper lock washer 48b may be disposed under the head 48ah of the first fastening member 48a, and the first fastening member 48a may pass through the first upper lock washer 48b. The first upper lock washer 48 may be a toothed lock washer, and a tooth 48bt of the first upper lock washer 48b may be inserted and fixed into a groove (not numbered) formed on the inside of the upper arm body 51.

The first disc spring 48d may be disposed under the first upper lock washer 48b. The first disc spring 48d may be convex toward the first upper lock washer 48b and may generate an elastic force in an axial direction of the first fastening member 48a.

The first upper washer 48e may be disposed under the first disc spring 48d, and the first fastening member 48a may pass through the first upper washer 48e.

The first upper bushing 48f may be disposed opposite the first disc spring 48d with respect to the first upper washer 48e. The first fastening member 48a may pass through the first upper bushing 48f. The first upper busing 48f may have a cylindrical shape having a flange (not numbered) formed at an upper end thereof. The flange of the first upper bushing 48f may contact the first upper groove 480a formed along the periphery of the hole 480h on an upper surface of the first body 480. A portion (not numbered) of the first upper bushing 48f may be inserted into the hole 480h of the first body 480 and may be disposed between an inner circumferential surface of the first body 480 and an outer circumferential surface of the first fastening member 48a.

The first lower bushing 48g may be disposed opposite the first upper busing 48f and may be spaced downward from the first upper bushing 48f. The first fastening member 48a may pass through the first lower bushing 48g. The first lower bushing 48g may have a cylindrical shape having a flange (not numbered) formed at a lower end thereof. The flange of the first lower bushing 48g may contact the first lower groove 480b formed along the periphery of the hole 480h on a lower surface of the first body 480. A portion (not numbered) of the first lower bushing 48g may be inserted into the hole 480h of the first body 480 and may be disposed between the inner circumferential surface of the first body 480 and the outer circumferential surface of the first fastening member 48a.

The first lower washer 48h may be disposed under the first lower bushing 48g, and the first fastening member 48a may pass through the first lower washer 48h.

The first lower lock washer 48c may be disposed opposite the first lower bushing 48g with respect to the first lower washer 48h, and the first fastening member 48a may pass through the first lower lock washer 48h. The first lower lock washer 48c may be a toothed lock washer, and a tooth 48ct of the first lower lock washer 48c may be inserted and fixed into a groove (not numbered) formed on the inside of the lower arm body 52.

Accordingly, the first body 480 may rotate with respect to the first fastening member 48a. That is, the first fastening member 48a may provide a first swivel axis. In addition, unless an external force at a certain level or higher is applied, the elastic force of the first disc spring 48d may allow the head 10 to be maintained at a constant swivel angle.

Figure 20:
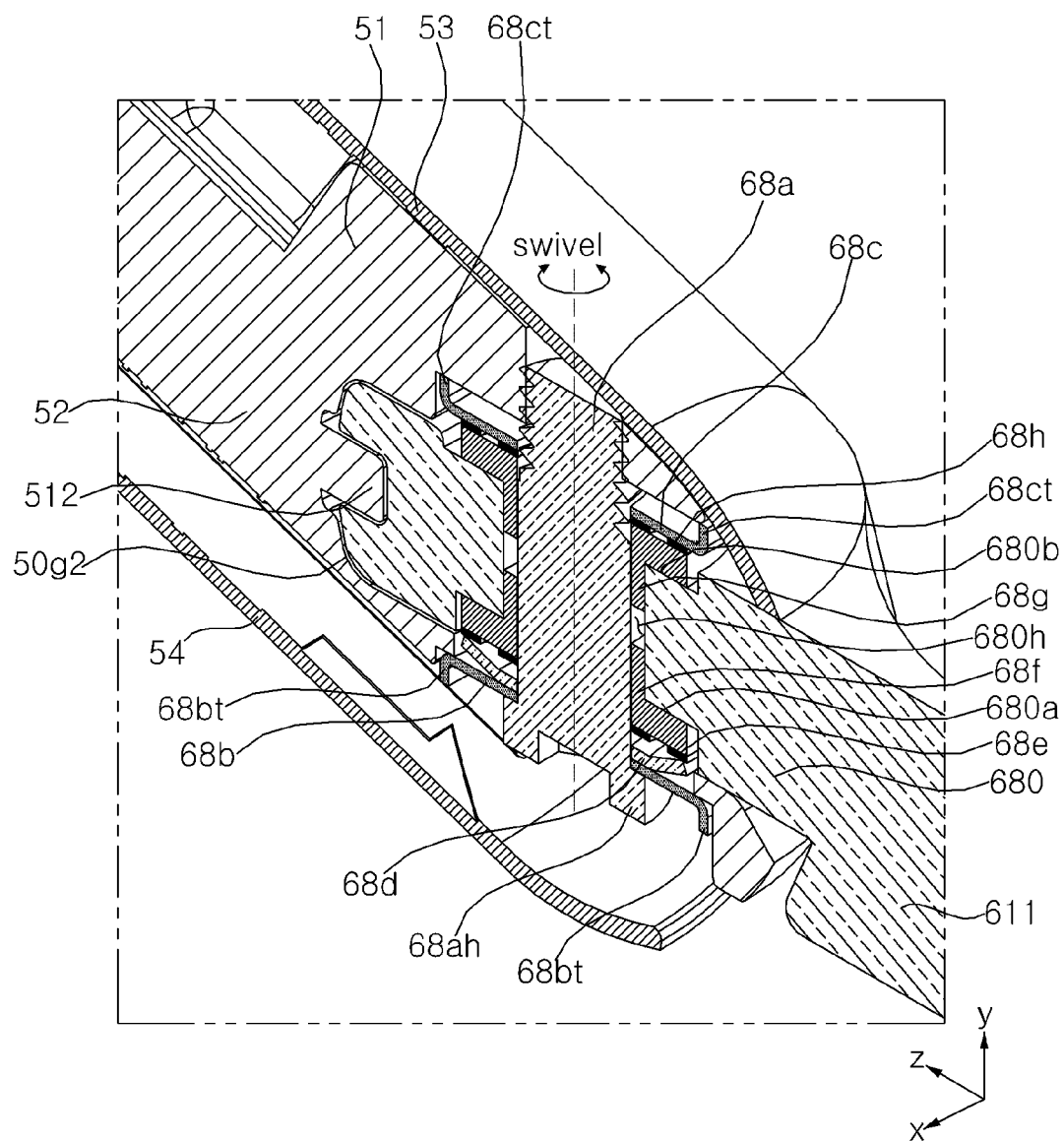

Referring to FIGS. 18 and 20, the second rotation unit 68 may include a second body 680, a second fastening member 68a, a second lower lock washer 68b, a second disc spring 68d, a second lower washer 68e, a second lower bushing 68f, a second upper bushing 68g, a second upper washer 68h, and a second upper lock washer 68c. The second rotation unit 68 may be referred to as a second swivel unit 68 or a second swivel module 68.

The second body 680 may be open at the top and bottom. The second body 680 may have a substantially donut shape. For example, the second body 680 may be connected to the vertical member 61 by a second connecting part 611. For example, the second body 680, the second connecting part 611, and the vertical member 61 may be formed as one body. The second body 680 may be inserted into the rear groove 50g2.

The second fastening member 68a may extend vertically. The second fastening member 68a may be inserted into the arm 50 through the lower insertion hole 52b (see FIG. 17) and may pass through a hole 680h formed at the center of the second body 680. A head 68ah of the second fastening member 68a may be disposed inside the lower arm body 52. The second fastening member 68a may be screwed into the upper fastening hole 51b (see FIG. 17).

The second lower lock washer 68b may be disposed above the head 68ah of the second fastening member 68a, and the second fastening member 68a may pass through the second lower lock washer 68b. The second lower lock washer 68b may be a toothed lock washer, and a tooth 68bt of the second lower lock washer 68b may be inserted and fixed into a groove (not numbered) formed on the inside of the lower arm body 52.

The second disc spring 68d may be disposed above the second lower lock washer 68b. The second disc spring 68d may be convex toward the second lower lock washer 68b and may generate an elastic force in an axial direction of the second fastening member 68a.

The second lower washer 68e may be disposed above the second disc spring 68d, and the second fastening member 68a may pass through the second lower washer 68e.

The second lower bushing 68f may be disposed opposite the second disc spring 68d with respect to the second lower washer 68e. The second fastening member 68a may pass through the second lower bushing 68f. The second lower bushing 68f may have a cylindrical shape having a flange (not numbered) formed at a lower end thereof. The flange of the second lower bushing 68f may contact the second lower groove 680a formed along the periphery of the hole 680h on a lower surface of the second body 680. A portion (not numbered) of the second lower bushing 68f may be inserted into the hole 680h of the second body 680 and may be disposed between an inner circumferential surface of the second body 680 and an outer circumferential surface of the second fastening member 68a.

The second upper bushing 68g may face the second lower busing 68f and may be spaced upward from the second lower busing 68f. The second fastening member 68a may pass through the second upper busing 68g. The second upper busing 68g may have a cylindrical shape having a flange (not numbered) formed at an upper end thereof. The flange of the second upper busing 68g may contact the second upper groove 680b formed along the periphery of the hole 680h on an upper surface of the second body 680. A portion (not numbered) of the second upper bushing 68g may be inserted into the hole 680h of the second body 680 and may be disposed between the inner circumferential surface of the second body 680 and the outer circumferential surface of the second fastening member 68a.

The second upper washer 68h may be disposed above the second upper bushing 68g, and the second fastening member 68a may pass through the second upper washer 68h.

The second upper lock washer 68c may be disposed opposite the second upper bushing 68g with respect to the second upper washer 68h, and the second fastening member 68a may pass through the second upper lock washer 68c. The second upper lock washer 68c may be a toothed lock washer, and a tooth 68ct of the second upper lock washer 68c may be inserted and fixed into a groove (not numbered) formed on the inside of the upper arm body 51.

Accordingly, the second body 680 may rotate with respect to the second fastening member 68a. That is, the second fastening member 68a may provide a second swivel axis. In addition, unless an external force at a certain level or higher is applied, the elastic force of the second disc spring 68d may allow the head 10 to be maintained at a constant swivel angle.

Figure 21:
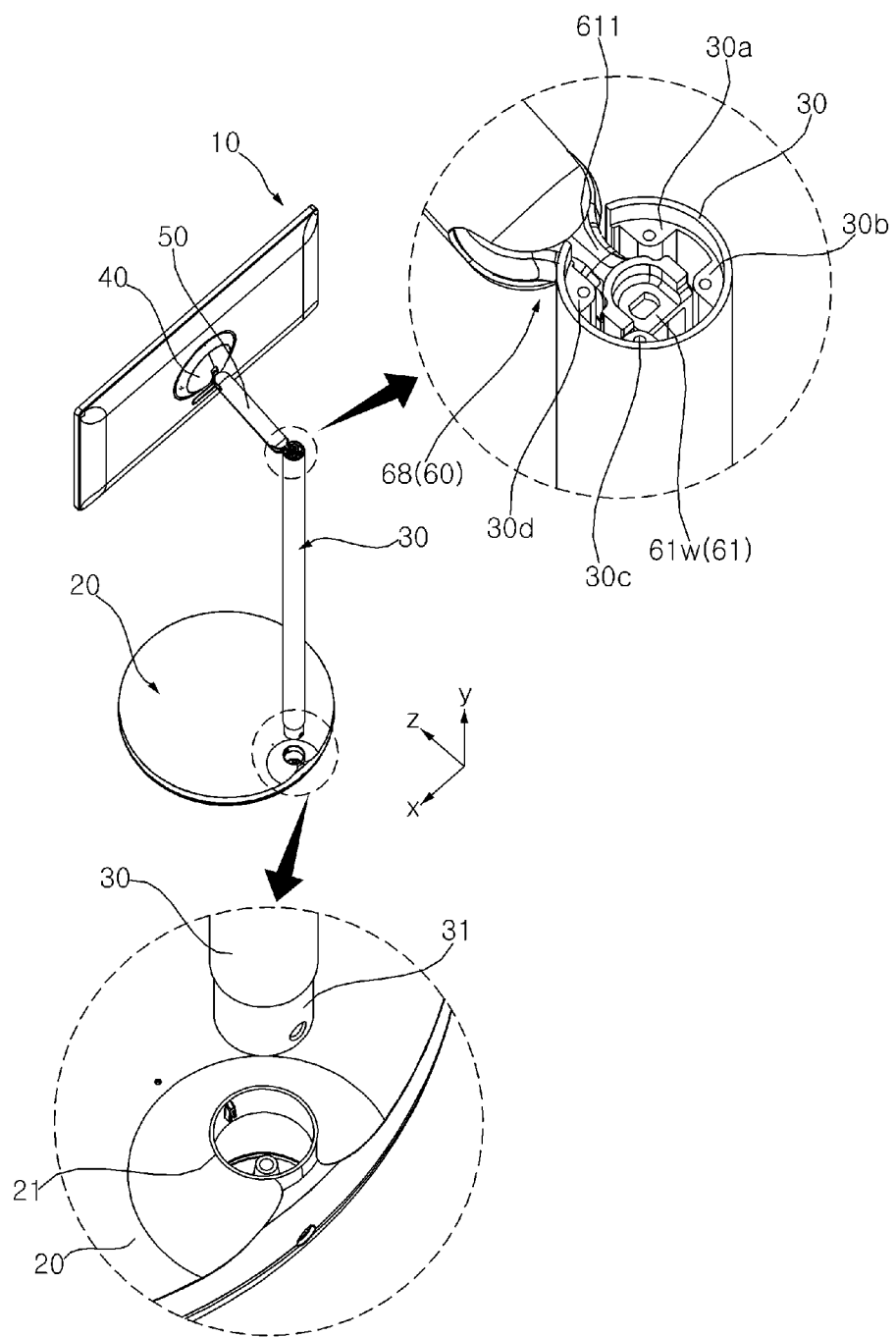

Referring to FIG. 21, the arm 50 may extend in a direction intersecting the head 10 and the pole 30. The arm 50 may connect the articulated connector 40 and the elevating module 60. The second rotation unit 68 of the elevating module 60 may be connected with the vertical member 61 by the second connecting part 611. The second connecting part 611 may pass through the pole 30.

The vertical member 61 may extend in a longitudinal direction of the pole 30. The vertical member 61 may be accommodated inside the pole 30.

The pole 30 may extend vertically and may surround the vertical member 61. A plurality of ribs 30a, 30b, 30c, and 30d may protrude toward the vertical member 61 from an inner circumferential surface of the pole 30 and may be spaced apart from each other in a circumferential direction of the pole 30. A first rib 30a, a second rib 30b, a third rib 30c, and a fourth rib 30d may be located at the vertices of an arbitrary square inside the pole 30.

In addition, an insertion part 31 of the pole 30 may be inserted into and coupled to a port 21 formed in an upper surface of the base 20.

Figure 22:
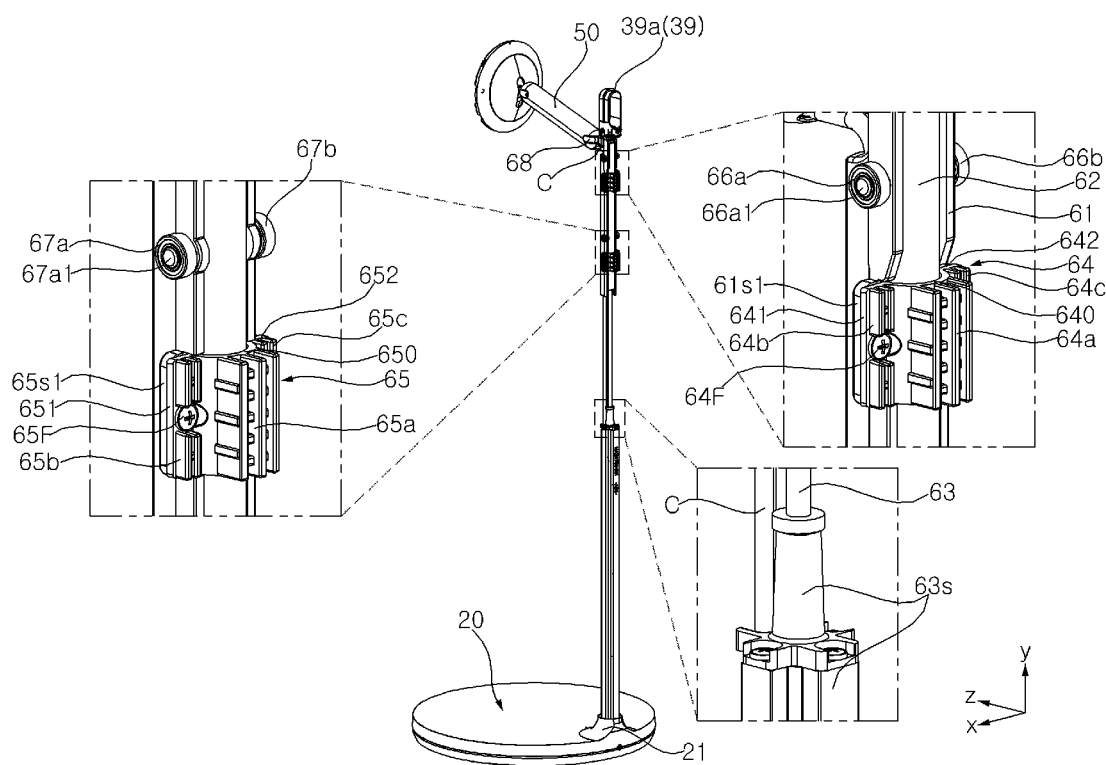

Referring to FIGS. 21 and 22, the vertical member 61 may be generally in the shape of a cylinder cut in half. The vertical member 61 may be open at the rear and bottom, and the top of the vertical member 61 may be blocked by a partition wall 61w.

A stem 63s may extend vertically and may be aligned with the vertical member 61. A lower end of the stem 63s may be inserted into the port 21 of the base 20.

Gas springs 62 and 63 may include an upper shaft 62 and a lower shaft 63 coupled to the upper shaft 62. The upper shaft 62 may extend in a longitudinal direction of the vertical member 61. The upper shaft 62 may have a cylindrical shape with a closed top. At least a portion of the upper shaft 62 may be accommodated in the vertical member 61. The lower shaft 63 may extend in a longitudinal direction of the upper shaft 62 and may have a smaller diameter than that of the upper shaft 62. That is, the lower shaft 63 may be inserted into the upper shaft 62. A lower end of the lower shaft 63 may be fixed on the stem 63s.

Clamps 64 and 65 may be disposed opposite the vertical member 61 with respect to the upper shaft 62. In other words, the upper shaft 62 may be disposed between the vertical member 61 and the clamps 64 and 65. For example, the clamps 64 and 65 may include a plurality of clamps 64 and 65 which are vertically spaced apart from each other.

The clamps 64 and 65 may include semi-cylinders 640 and 650, left flanges 641 and 651, and right flanges 642 and 652. The semi-cylinders 640 and 650 may contact an outer circumference of the upper shaft 62. The left flanges 641 and 651 may extend leftward from a first side of the semi-cylinders 640 and 650 and may be coupled to first parts 61$s$1 and 65$s$1 of the vertical member 61 by fastening members 64F and 65F. The right flanges 642 and 652 may extend rightward from a second side of the semi-cylinders 640 and 650 and may be coupled to a second part (not shown) of the vertical member 61 by a fastening member (not shown).

Accordingly, the upper shaft 62 may be removably coupled to the vertical member 61 and may move upward or downward along the lower shaft 63.

Figure 23:
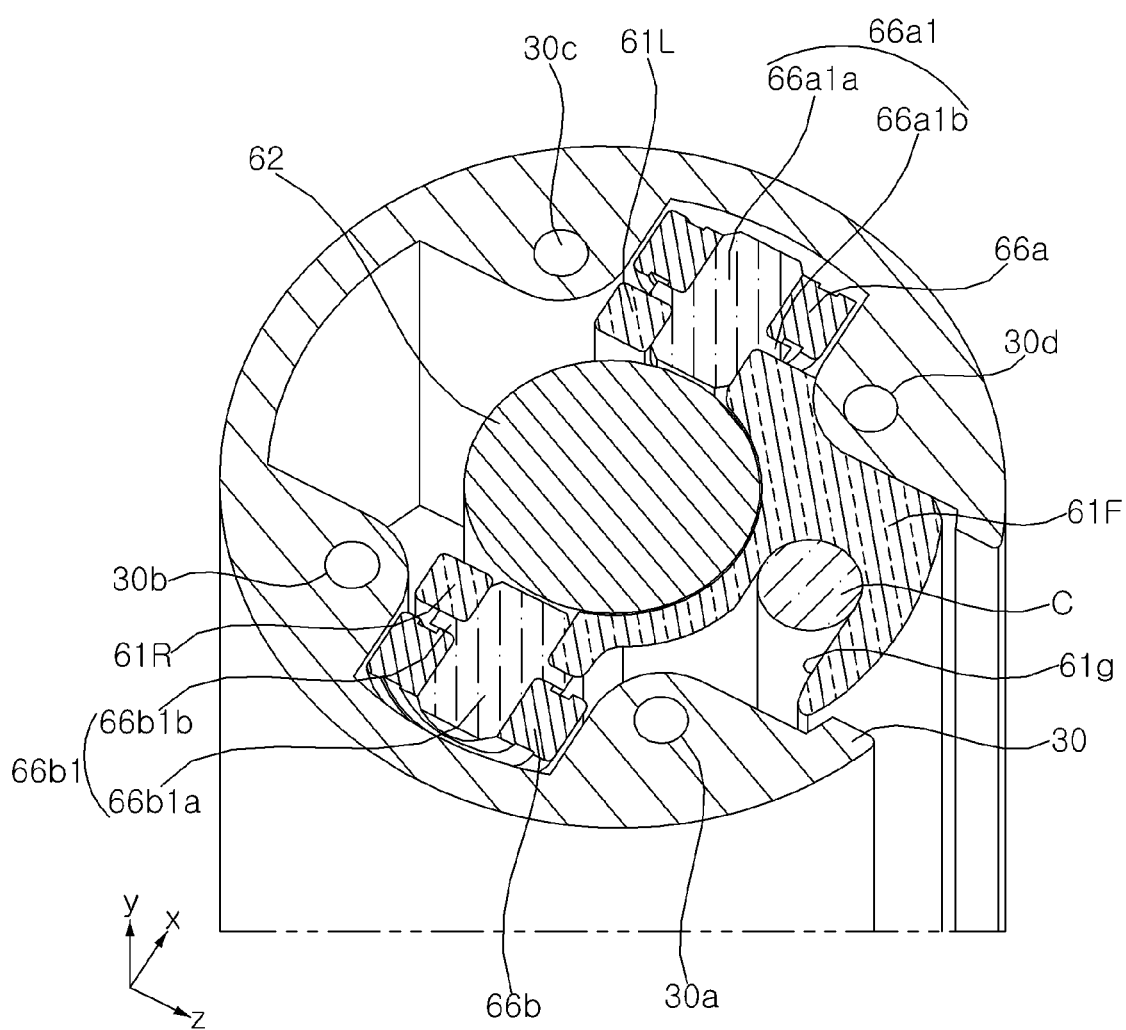

Referring to FIGS. 22 and 23, rollers 66$a$, 66$b$, 67$a$, and 67$b$ may be adjacent to the clamps 64 and 65. For example, first rollers 66$a$ and 66$b$ may be adjacent to a first clamp 64, and second rollers 67$a$ and 67$b$ may be adjacent to a second clamp 65.

The first rollers 66$a$ and 66$b$ may include a first left roller 66$a$ and a first right roller 66$b$. A body 66$a$1$a$ of a first left pin 66$a$1 may pass through the first left roller 66$a$ and a left part 61L of the vertical member 61. A flange 66$a$1$b$ of the first left pin 66$a$1 may be disposed between the first left roller 66$a$ and the left part 61L. The first left roller 66$a$ may be coupled to the left part 61L by the first left pin 66$a$1. A body 66$b$1$a$ of a first right pin 66$b$1 may pass through the first right roller 66$b$ and a right part 61R of the vertical member 61. A flange 66$b$1$b$ of the first right pin 66$b$1 may be disposed between the first right roller 66$b$ and the right part 61R. The first right roller 66$b$ may be coupled to the right part 61R by the first right pin 66$b$1.

For example, the second rollers 67$a$ and 67$b$ may have the same shape as the first rollers 66$a$ and 66$b$. That is, the above description of the first rollers 66$a$ and 66$b$ may also be applied to the second rollers 67$a$ and 67$b$. Accordingly, the second left roller 67$a$ may be coupled to the left part 61L, and the second right roller 67$b$ may be coupled to the right part 61R.

In addition, the left rollers 66$a$ and 67$a$ may be disposed between the third rib 30$c$ and the fourth rib 30$d$ and may contact the third rib 30$c$ and the fourth rib 30$d$. The right rollers 66$b$ and 67$b$ may be disposed between the first rib 30$a$ and the second rib 30$b$ and may contact the first rib 30$a$ and the second rib 30$b$.

Accordingly, the vertical member 61 may smoothly move up and down inside the pole 30 by the rollers 66$a$, 66$b$, 67$a$, and 67$b$.

Figure 24:
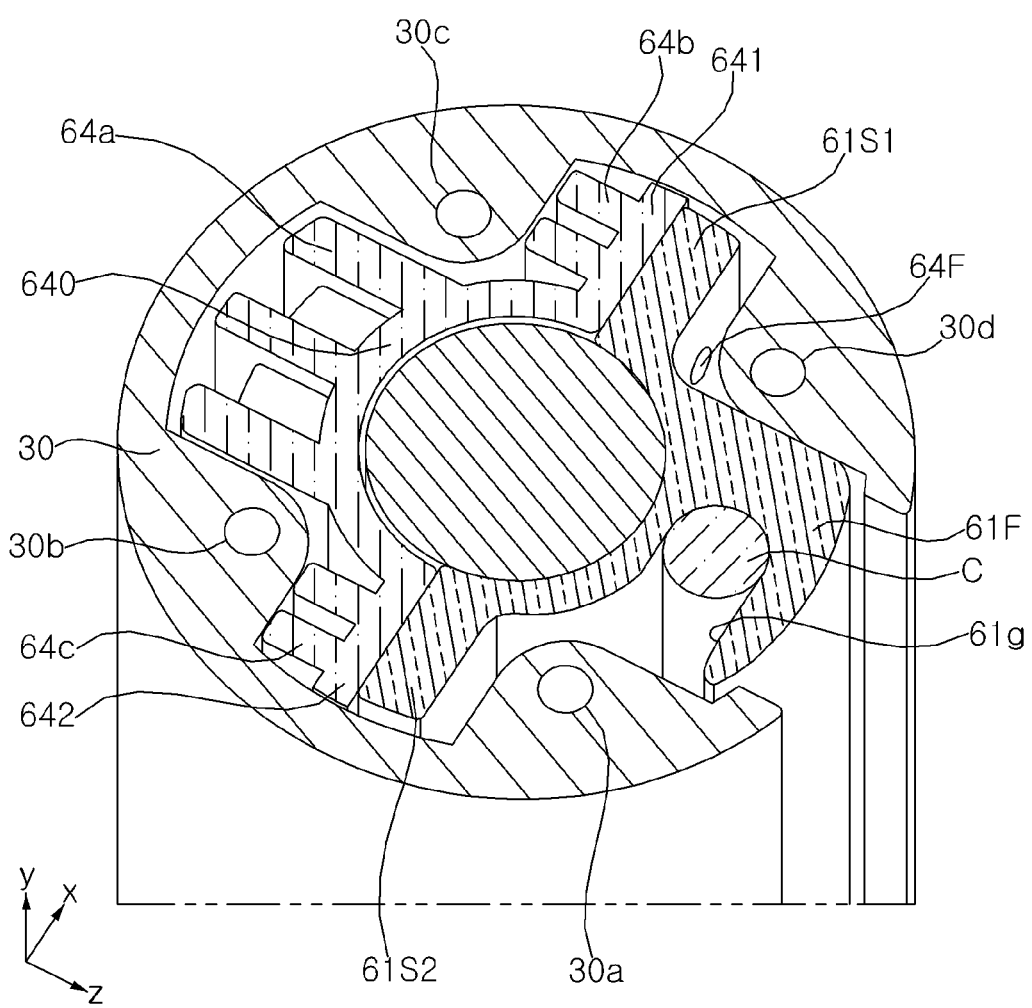

Referring to FIGS. 22 and 24, a left flange 641 of the first clamp 64 may be disposed between the third rib 30$c$ and the fourth rib 30$d$. A first right flange 642 of the first clamp 64 may be disposed between the first rib 30$a$ and the second rib 30$b$. The first clamp 64 may include a first central protrusion 64$a$, a first left protrusion 64$b$, and a first right protrusion 64$c$.

The first central protrusion 64$a$ may protrude toward the inside of the pole 30 from a first semi-cylinder 650 and may contact the inside of the pole 30. The first left protrusion 64$b$ may protrude toward the third rib 30$c$ from the first left flange 641 and may contact the third rib 30$c$. The first right protrusion 64$c$ may protrude toward the second rib 30$b$ from the first right flange 642 and may contact the second rib 30$b$. Accordingly, the first central protrusion 64$a$, the first left protrusion 64$b$, and the first right protrusion 64$c$ may cause friction between the vertical member 61 and the pole 30.

For example, the second clamp 65 may be spaced downward from the first clamp 64 and may have the same shape as the first clamp 64. That is, the above description of the first clamp 64 may also be applied to the second clamp 65. Accordingly, a second central protrusion 65$a$, a second left protrusion 65$b$, and a second right protrusion 65$c$ of the second clamp 65 may cause friction between the vertical member 61 and the pole 30.

Accordingly, unless an external force at a certain level or higher is applied, the frictional force between the protrusions 64$a$, 64$b$, 64$c$, 65$a$, 65$b$, and 65$c$ and the pole 30 may allow the vertical member 61 to be maintained at a constant position (height) with respect to the base 20.

Referring to FIGS. 23 and 24, a cable groove 61$g$ may be formed in a front portion 61F of the vertical member 61 and may be elongated vertically. The cable C may be inserted into the cable groove 61$g$. The cable C may be disposed along the cable groove 50$c$ (see FIG. 14) of the arm 50 and may be electrically connected to the head 10. The cable C may be disposed along the stem 63$s$ (see FIG. 22) and may be electrically connected to a battery Bt (see FIG. 1) disposed in the base 20 and the like. The battery Bt may supply power to the head 10 through the cable C. The battery Bt may be a rechargeable battery. The cable C may be a power cable and/or a signal cable. The cable C may have several strands.

Figure 25:
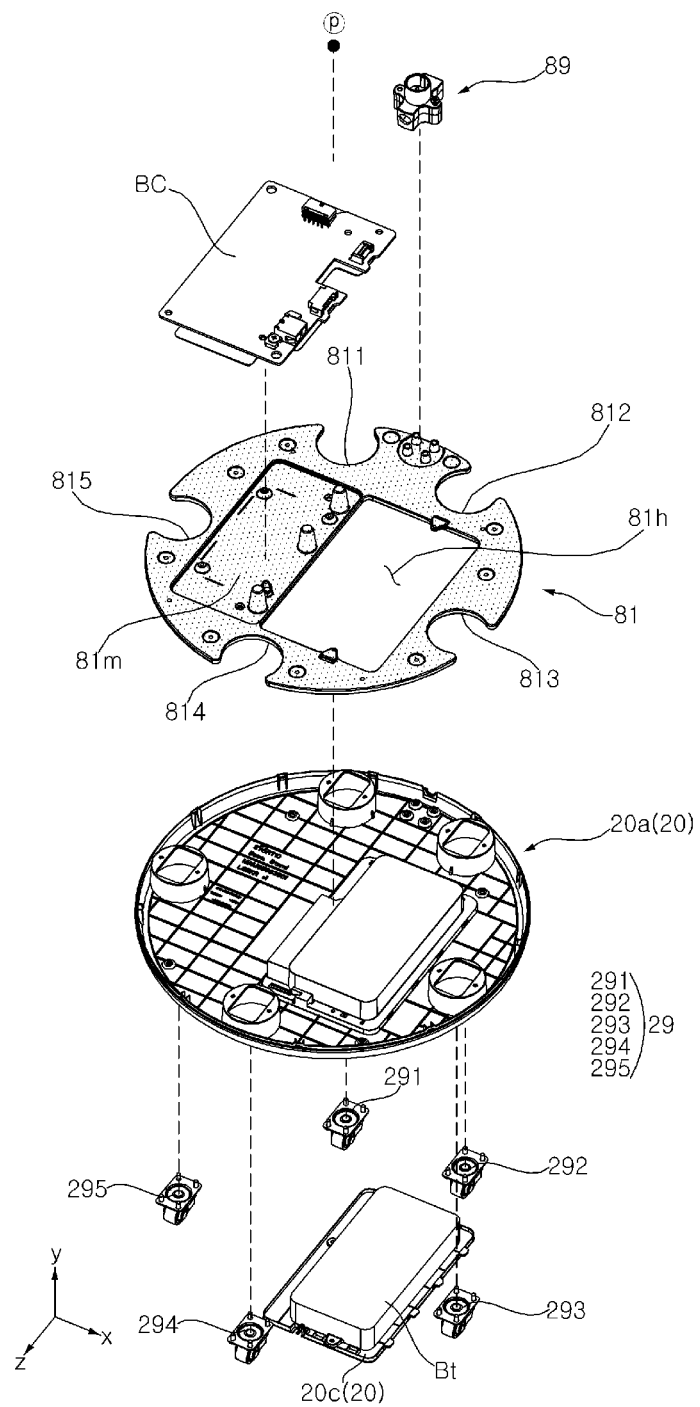
Figure 26:
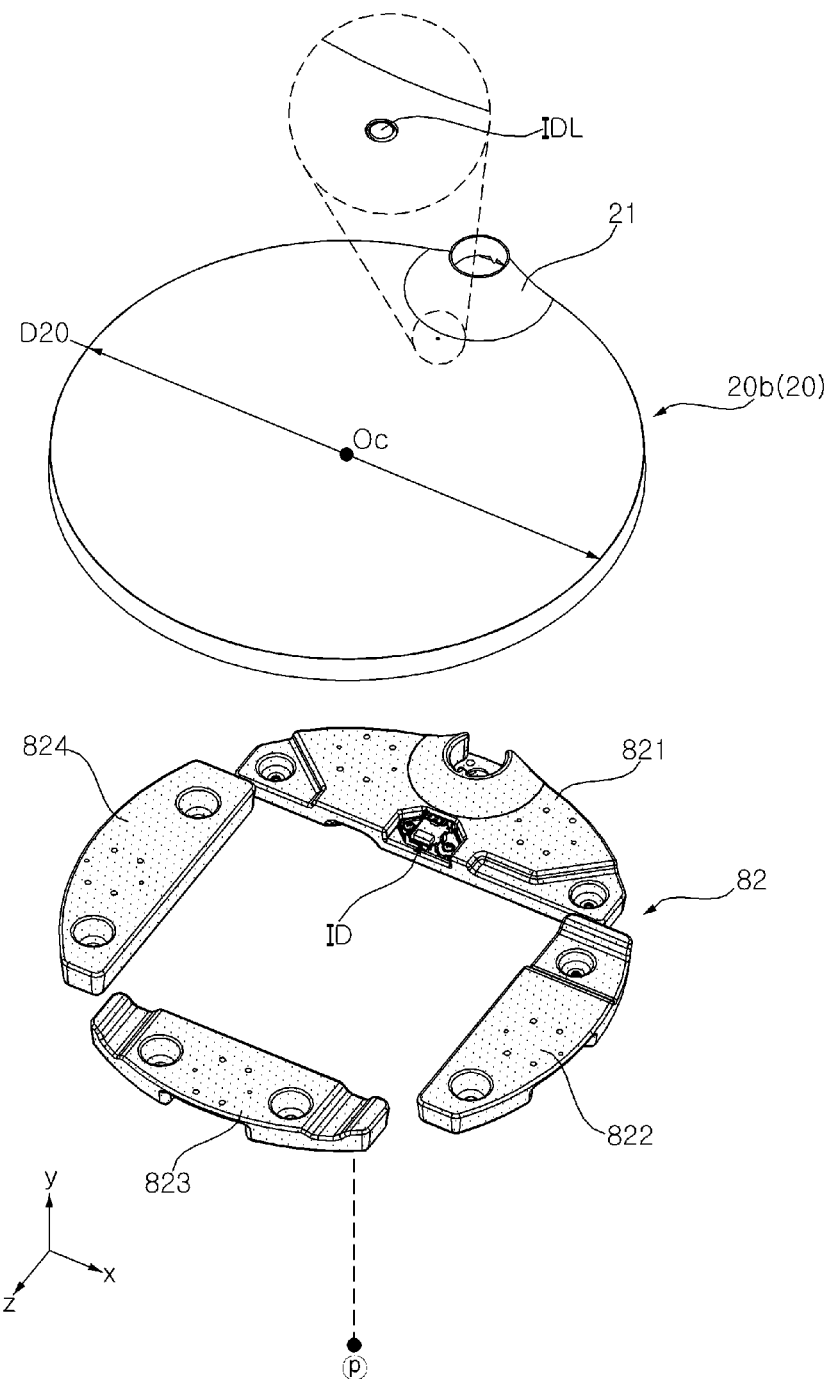

Referring to FIGS. 25 and 26, the base 20 may include a lower body 20$a$ and an upper body 20$b$. The lower body 20$a$ may form a lower surface of the base 20 and may have a generally round tray shape which is open at the top. The upper body 20$b$ may form an upper surface of the base 20 and may have a generally round tray shape which is open at the bottom. An outer diameter D20 of the upper body 20$b$ may be substantially equal to an outer diameter of the lower body 20$a$.

A flat weight 81 may be disposed in an inner space of the base 20, i.e., a space between the lower body 20$a$ and the upper body 20$b$, and may be disposed on the lower body 20$a$. The flat weight 81 may be referred to as a support weight or a flat plate.

A weight 82 may be disposed in the inner space of the base 20 and may be disposed on the flat weight 81. The weight 82 may be referred to as a core weight.

A substate BC and a bottom connector 89 may be disposed in the inner space of the base 20 and may be disposed on the flat weight 81. An indicator ID may be disposed on the weight 82. The battery Bt and a wheel assembly 29 may be coupled to a lower surface of the lower body 20$a$.

Figure 27:
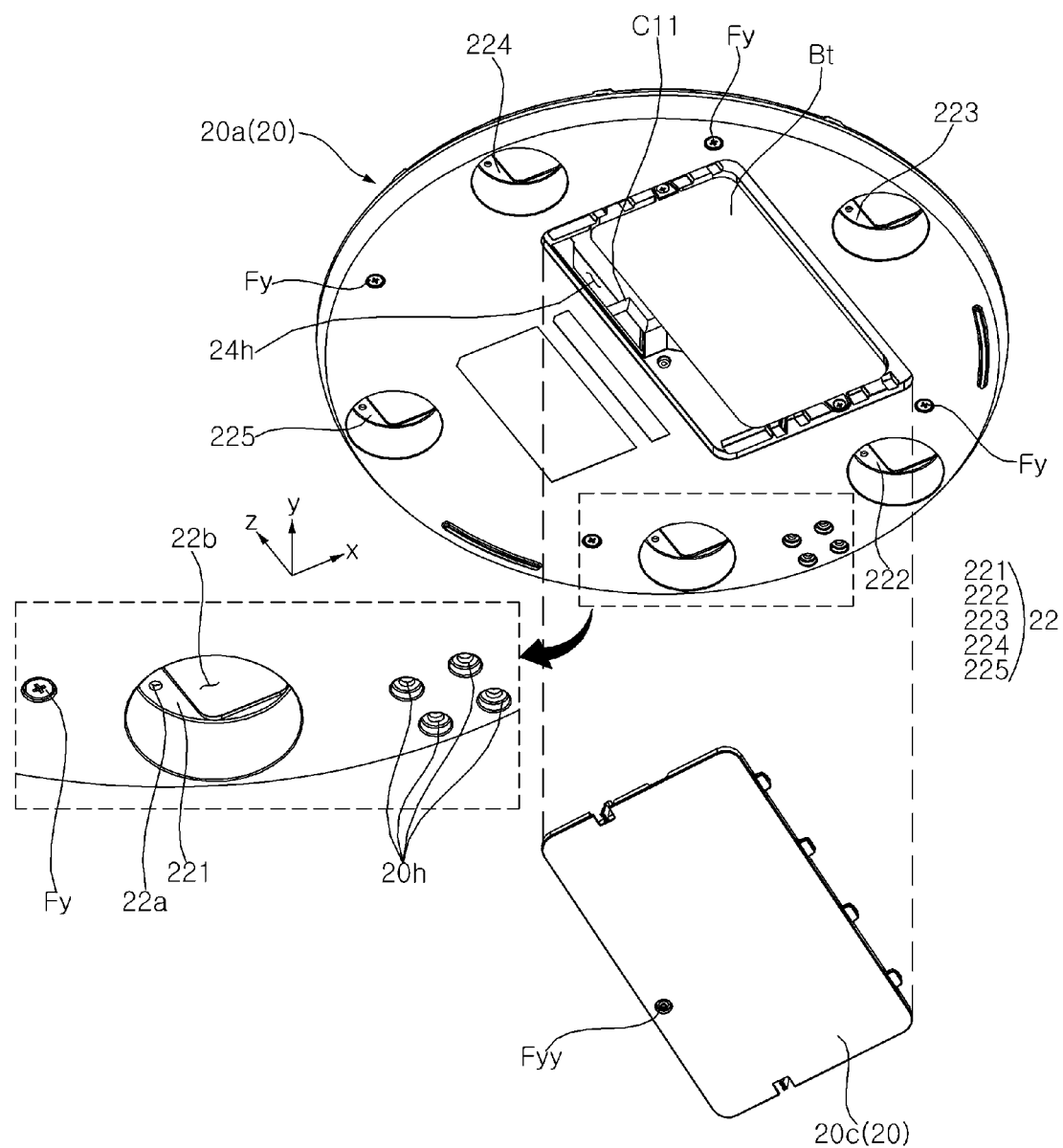
Figure 28:
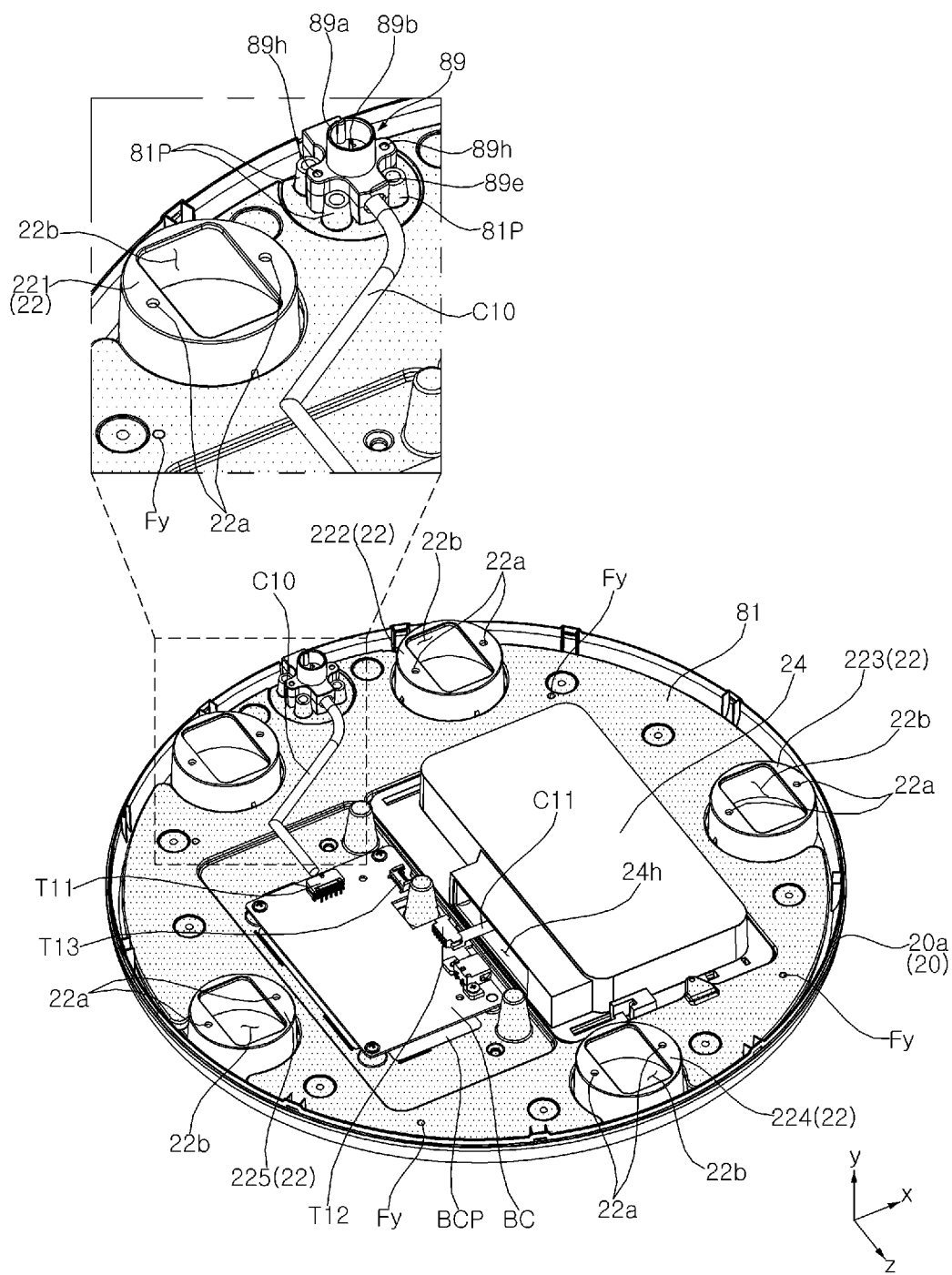

Referring to FIGS. 27 and 28, a seating part 24 may be formed by being pressed upward from the lower surface of the lower body 20$a$. The seating part 24 may protrude upward beyond an upper surface of the lower body 20$a$. An opening 24$h$ may be formed in a side wall of the seating part 24 and may communicate with the inner space of the base 20.

The battery Bt may be inserted into the seating part 24 from below the lower body 20$a$. The battery Bt may be seated on and coupled to the seating part 24. A second cable C11 may be electrically connected to the battery Bt and may pass through the opening 24$h$. A battery cover 20$c$ may be removably coupled to the lower body 20$a$ by a fastening member Fyy such as a screw, and may cover a lower surface of the battery Bt. The cover 20$c$ may form the lower surface of the base 20 along with the lower body 20$a$.

For example, the battery Bt may be a rechargeable battery. For example, the battery Bt may be replaceable.

A recessed portion 22 may be formed by being pressed upward from the lower surface of the lower body 20$a$. The recessed portion 22 may protrude upward beyond the upper surface of the lower body 20a. The recessed portion 22 may have a cylindrical shape. The recessed portion 22 may be adjacent to a circumference of the lower body 20a. For example, a plurality of recessed portions 221, 222, 223, 224, and 225 may be spaced apart from each other along the circumference of the lower body 20a.

A lower fixing hole 22a may be formed through an upper surface of the recessed portion 22. For example, the lower fixing hole 22a may include a pair of fixing holes 22a which are spaced apart from each other. A base hole 22b may be formed through the upper surface of the recessed portion 22 and may be spaced apart from the lower fixing hole 22a. For example, the base hole 22b may be disposed between the pair of fixing holes 22a. Each of the plurality of recessed portions 221, 222, 223, 224, and 225 may have the lower fixing hole 22a and the base hole 22b.

The flat weight 81 may be formed flat. The flat weight 81 may be parallel to the upper surface of the lower body 20a. The flat weight 81 may have a generally circular plate shape. The flat weight 81 may include a flat weight hole 81h, a mounting surface 81m, and major arcs 811, 812, 813, 814, and 815 (see FIG. 25).

The flat weight hole 81h may be formed by passing through the flat weight 81 in a thickness direction of the flat weight 81 and may correspond to the seating part 24. When the flat weight 81 is seated on the lower body 20a, the seating part 24 may pass through the flat weight hole 81h.

The mounting surface 81m may be adjacent to the flat weight hole 81h and may form a portion of the upper surface of the flat weight 81.

The major arcs 811, 812, 813, 814, and 815 may be formed from a circumference of the flat weight 81 toward the inside of the flat weight 81. The major arcs 811, 812, 813, 814, and 815 may be holes formed by cutting out a portion of the flat weight 81 and may be in the shape of an arc greater than a semi-circle. When the flat weight 81 is seated on the lower body 20a, the recessed portion 22 may be disposed in the major arcs 811, 812, 813, 814, and 815. Each of a first major arc 811, a second major arc 812, a third major arc 813, a fourth major arc 814, and a fifth major arc 815 may extend along a portion of a lateral surface of each of a first recessed portion 221, a second recessed portion 222, a third recessed portion 223, a fourth recessed portion 224, and a fifth recessed portion 225. Each of the first major arc 811, the second major arc 812, the third major arc 813, the fourth major arc 814, and the fifth major arc 815 may be engaged with the lateral surface of each of the first recessed portion 221, the second recessed portion 222, the third recessed portion 223, the fourth recessed portion 224, and the fifth recessed portion 225.

A fastening member Fy, such as a screw, may pass through the lower surface of the lower body 20a and may be coupled to the flat weight 81 seated on the lower body 20a. For example, a plurality of fastening members Fy may be adjacent to an outer circumference of the flat weight 81 and may be spaced apart from each other along the circumference of the flat weight 81. Accordingly, the flat weight 81 may be removably coupled to the lower body 20a.

The substrate BC may be mounted on the mounting surface 81m. The substrate BC may be a Printed Circuit Board (PCB). The substrate BC may be referred to as a battery charger. A bottom plate BCP may be disposed between the substrate BC and the mounting surface 81m.

The bottom connector 89 may be disposed on the flat weight 81. For example, the bottom connector 89 may be disposed between the first recessed portion 221 and the second recessed portion 222. The bottom connector 89 may include a bottom housing 89a, at least one pin 89b, and a coupling hole 89h. The bottom housing 89a may have a hollow cylindrical shape, and the pin 89b may be disposed in an inner space of the bottom housing 89a. The coupling hole 89h may be disposed outside of the bottom housing 89a. The bottom connector 89 may be referred to as a bottom docking connector.

A first end of a first cable C10 may be electrically connected to the bottom connector 89, and a second end of the first cable C10 may be electrically connected to a first terminal T11 of the substrate BC. A first end of the second cable C11 may be electrically connected to a second terminal T12 of the substrate BC, and a second end of the second cable C11 may be electrically connected to the battery Bt.

A coupling part 81P may protrude upward from the upper surface of the flat weight 81. A plurality of coupling parts 81P may be disposed around the bottom connector 89.

Figure 29:
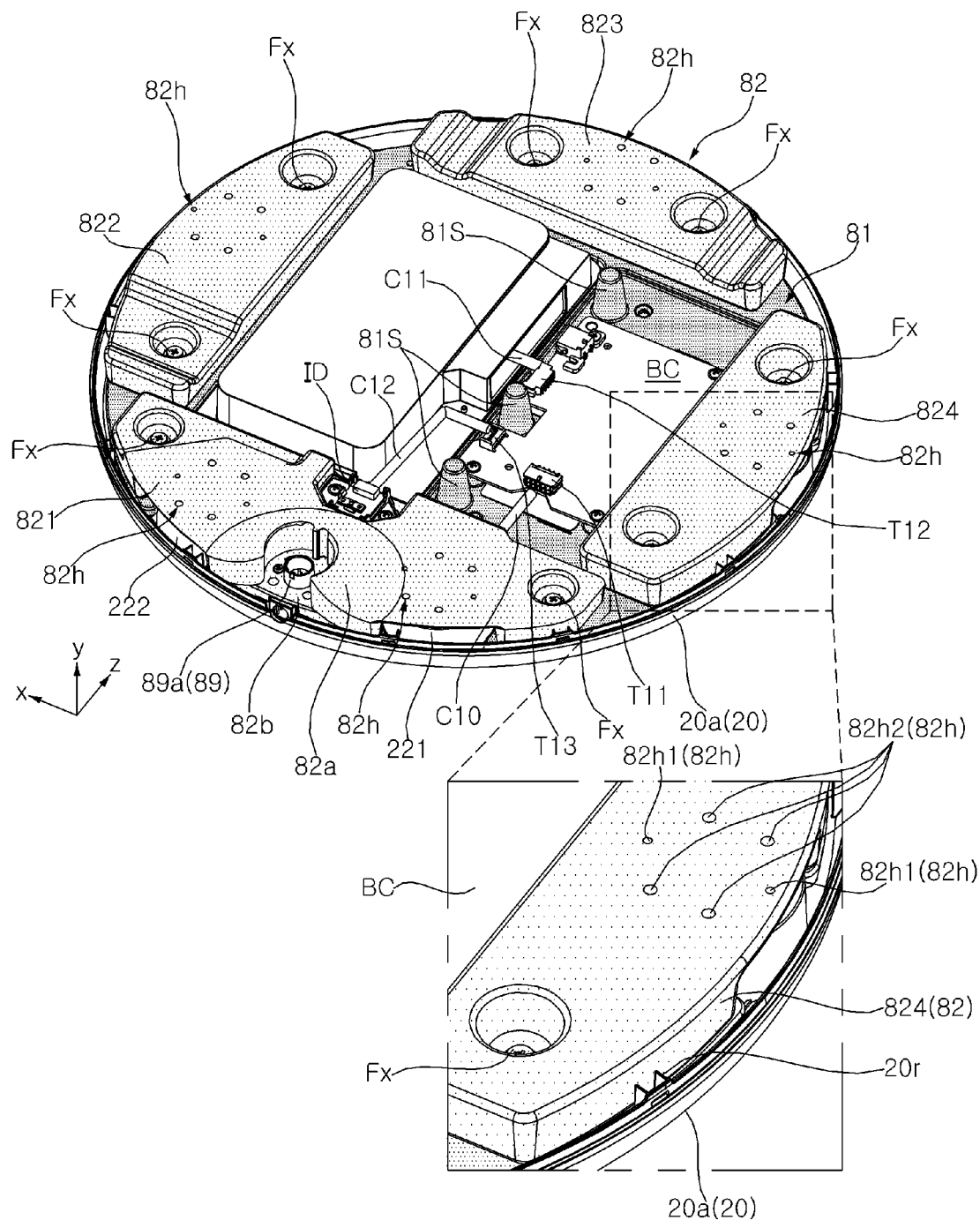

Referring to FIGS. 28 and 29, a weight 82 may be adjacent to the circumference of the flat weight 81 and may be seated on the flat weight 81. For example, a plurality of weights 821, 822, 823, and 824 may be disposed along the circumference of the flat weight 81 and may be adjacent to each other. Alternatively, the plurality of weights 821, 822, 823, and 824 may be formed as one body.

A first weight 821 may extend along a front portion of a lateral wall of the lower body 20a. The first recessed portion 221 and the second recessed portion 222 may be received in a groove formed in a lower surface of the first weight 821. A fastening member Fx, such as a screw, may pass through the first weight 821 and may be coupled to a portion of the flat weight 81 on which the first weight 821 is placed. That is, the first weight 821 may be coupled to the flat weight 81. Meanwhile, the first cable C10 may be disposed in a cable groove formed in a lower surface of the first weight 821.

The second weight 822 may extend along a left portion of the lateral wall of the lower body 20a. The third recessed portion 223 may be received in a groove formed in a lower surface of the second weight 822. The fastening member Fx, such as a screw, may pass through the second weight 822 and may be coupled to a portion of the flat weight 81 on which the second weight 822 is placed. That is, the second weight 822 may be coupled to the flat weight 81.

The third weight 823 may extend along a rear portion of the lateral wall of the lower body 20a. The fourth recessed portion 224 may be received in a groove formed in a lower surface of the third weight 823. The fastening member Fx, such as a screw, may pass through the third weight 823 and may be coupled to a portion of the flat weight 81 on which the third weight 823 is placed. That is, the third weight 823 may be coupled to the flat weight 81.

The fourth weight 824 may extend along a right portion of the lateral wall of the lower body 20a. The fifth recessed portion 225 may be received in a groove formed in a lower surface of the fourth weight 824. The fastening member Fx, such as a screw, may pass through the fourth weight 824 and may be coupled to a portion of the flat weight 81 on which the fourth weight 824 is placed. That is, the fourth weight 824 may be coupled to the flat weight 81.

In addition, an upper fixing hole 82h1 may be formed in each of the plurality of weights 821, 822, 823, and 824, and may be aligned with the lower fixing hole 22a of each of the plurality of recessed portions 221, 222, 223, 224, and 225.

In this case, the first recessed portion 221 and the second recessed portion 222 may be coupled to the first weight 821 in such a manner that a fastening member F1 (see FIG. 32), such as a screw, is coupled to the upper fixing hole 82h1 of the first weight 821 through the lower fixing hole 22a. In the same manner, the third recessed portion 223, the fourth recessed portion 224, and the fifth recessed portion 225 may be coupled to the second weight 822, the third weight 823, and the fourth weight 824, respectively.

Accordingly, the plurality of weights 821, 822, 823, and 824 may be coupled to the flat weight 81 and the lower body 20a.

The aforementioned plurality of weights 821, 822, 823, and 824 may be disposed along the circumference of the lower body 20a. The weights 821, 822, 823, and 824 may include a metal material. For example, the weights 821, 822, 823, and 824 may be formed by casting using a material such as Fe. In this case, the weights 821, 822, 823, and 824 may improve stability of the base 20. Here, as the stability of the base 20 increases, the base 20 placed on the ground may not be easily overturned.

The aforementioned flat weight 81 may support the plurality of weights 821, 822, 823, and 824. Flatness of the plurality of weights 821, 822, 823, and 824 may be corrected by the flat weight 81. For example, the flat weight 81 may be formed by die casting using a material such as aluminum Al. A mass of the flat weight 81 may be smaller than a mass of the weight 82. A thickness of the flat weight 81 may be smaller than a thickness of the weight 82. In this case, the stability of the base 20 may be mainly achieved by the weight 82, and the flatness of the weight 82 may be corrected by the flat weight 81.

The bottom housing 89a of the bottom connector 89 may pass through the first weight 821. A fastening member 89F (see FIG. 38), such as a screw, may pass through a hole (see FIG. 38) of the first weight 821 disposed around the bottom housing 89a and may be coupled to the coupling hole 89h of the bottom connector 89. Accordingly, the bottom connector 89 may be coupled to the first weight 821 at a position between the flat weight 81 and the first weight 821.

A ridge 82a may be formed at the center of the first weight 821 and may be in the shape of a monticule. The ridge 82a may be formed around the bottom housing 89a of the bottom connector 89. The ridge 82a may correspond to a shape of the port 21 (see FIG. 26) of the upper body 20b and may support the port 21.

A supporter 81S may protrude upward from an upper surface of the flat weight 81 and may be adjacent to the substrate BC. For example, the supporter 81S may be provided in plurality. At a position near the substrate BC, the supporter 81S may support the upper body 20b and may prevent damage to the substrate BC caused due to sagging or pressing of the upper body 20b.

Figure 30:
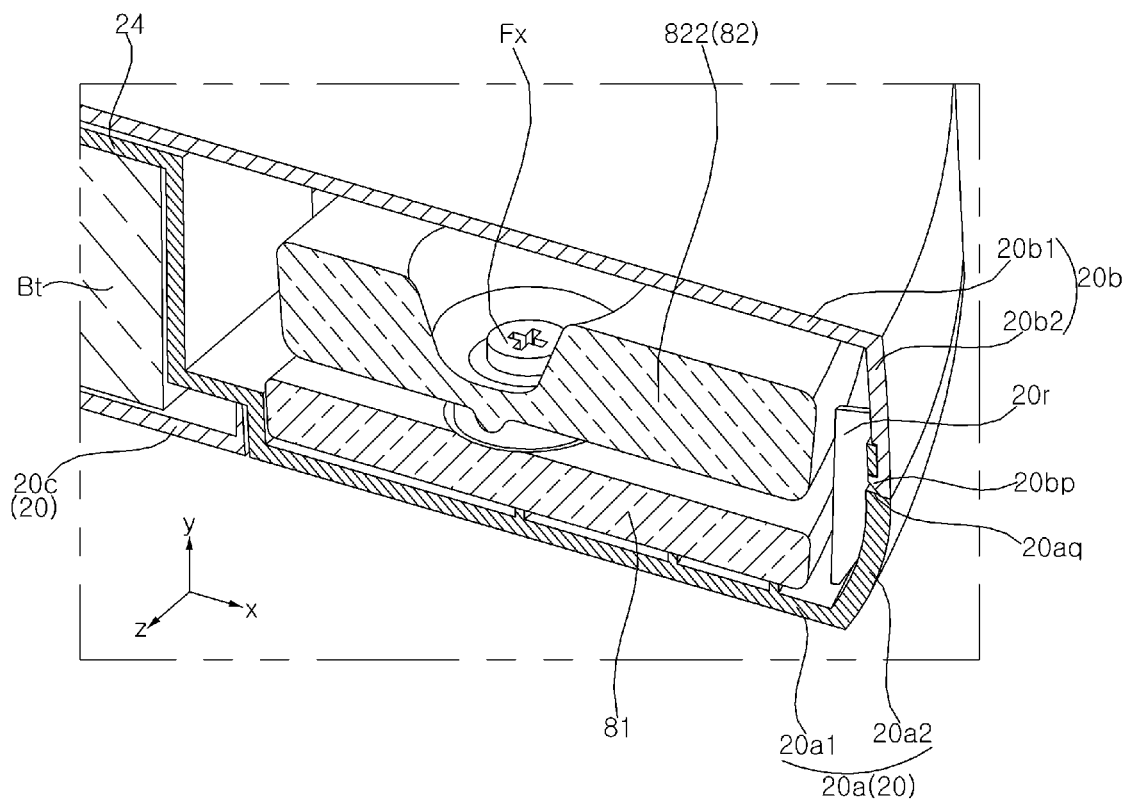

Referring to FIG. 30, the lower body 20a may include a bottom 20a1 and a lateral wall 20a2. A snap groove 20aq may be formed in the lateral wall 20a2 of the lower body 20a. The upper body 20b may include a top 20b1 and a lateral wall 20b2. A snap projection 20bp may be formed on the inside of the lateral wall 20b2 of the upper body 20b and may be coupled to the snap groove 20aq by a snap-fit connection. Accordingly, the upper body 20b may be removably coupled to the lower body 20a.

A support rib 20r may be formed on the inside of the lateral wall 20a2 of the lower body 20a. The support rib 20r may be adjacent to or may contact a lateral surface of the weight 82 and/or the flat weight 81. Accordingly, the support rib 20r may minimize deformation of the base 20.

Referring back to FIGS. 28 and 29, a weight hole 82h2 may be formed in each of the plurality of weights 821, 822, 823, and 824. For example, the number of the weight holes 82h2 may be four or any number. Four weight holes 82h2 may be located at the vertices of a square.

The weight holes 82h2 of the first weight 821 may vertically communicate with the base holes 22b of the first recessed portion 221 and the second recessed portion 222. The weight hole 82h2 of the second weight 822 may vertically communicate with the base hole 22b of the third recessed portion 223. The weight hole 82h2 of the third weight 823 may vertically communicate with the base hole 22b of the fourth recessed portion 224. The weight hole 82h2 of the fourth weight 824 may vertically communicate with the base hole 22b of the fifth recessed portion 225.

Figure 31:
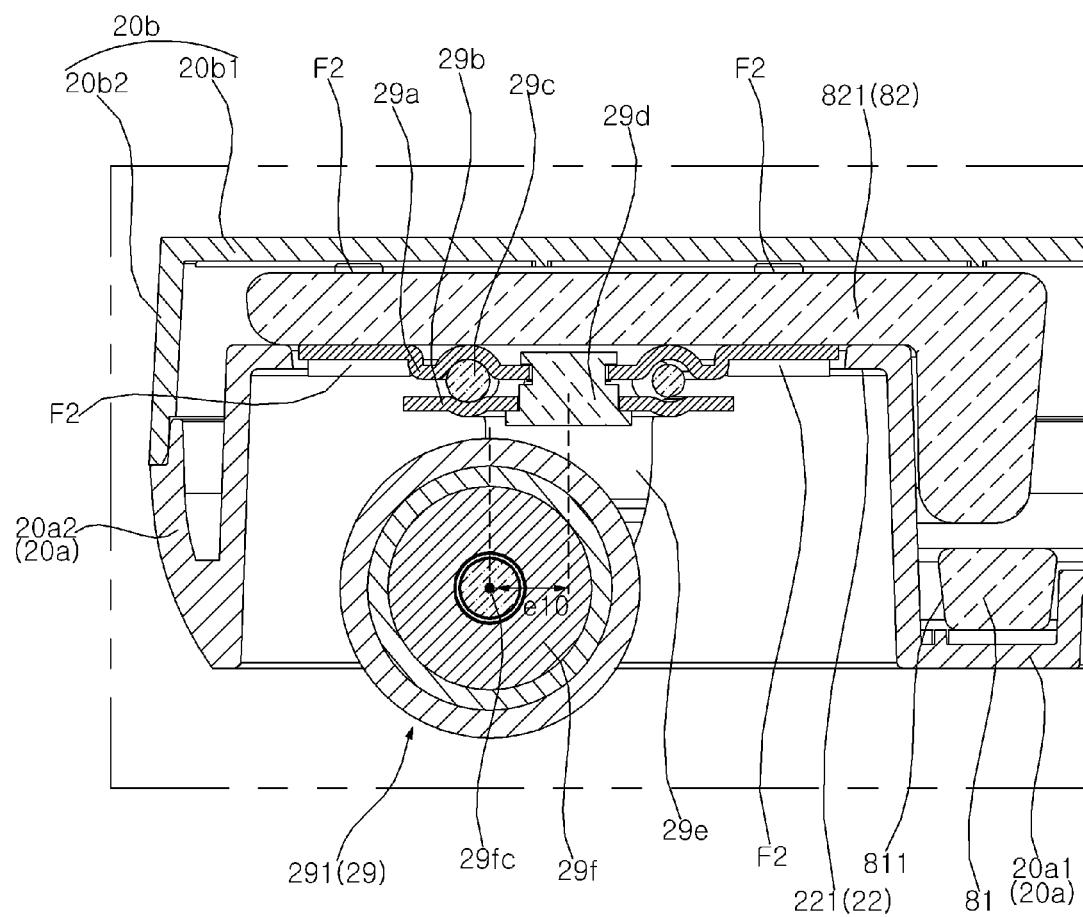
Figure 32:
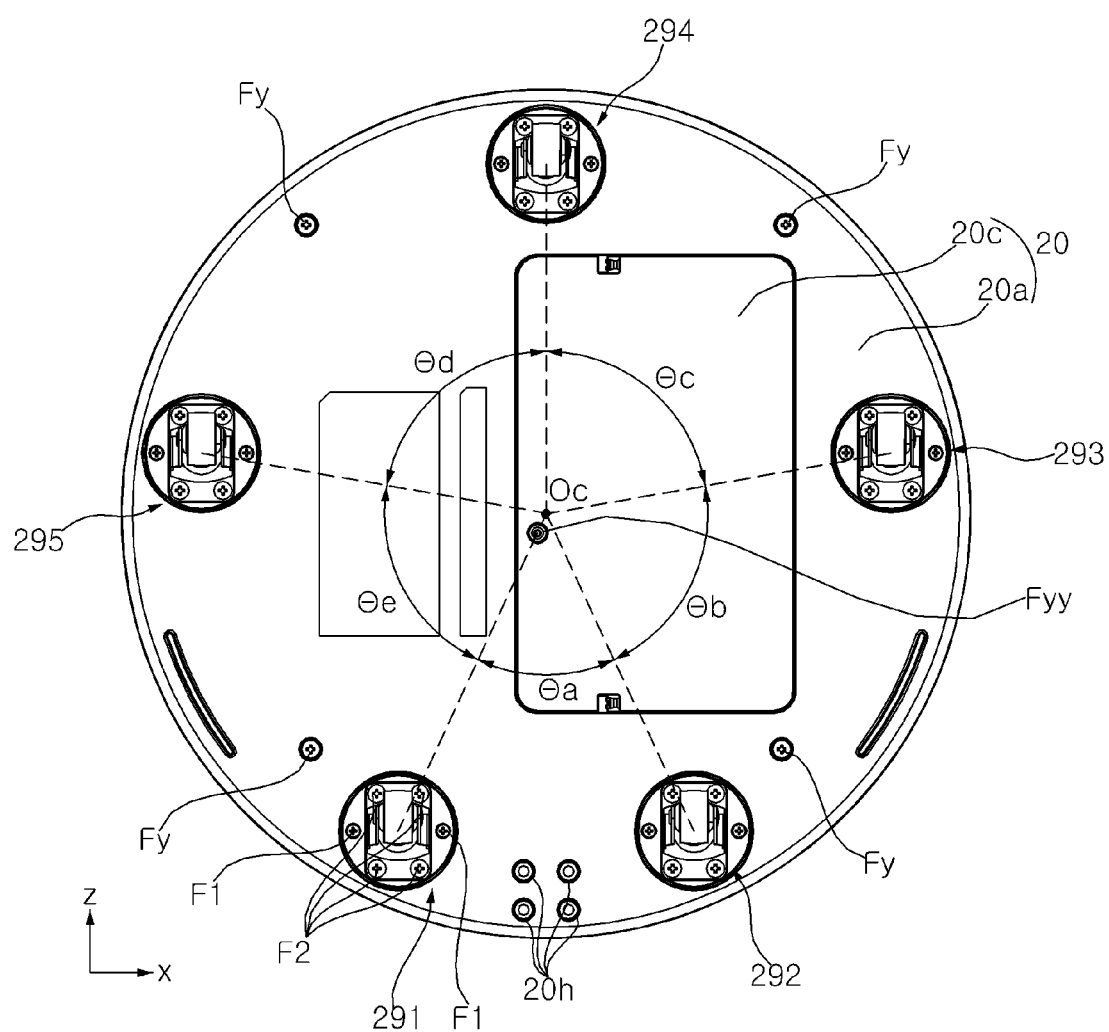

Referring to FIGS. 31 and 32, the wheel assembly 29 may include an upper plate 29a, a lower plate 29b, a bearing 29c, a shaft 29d, a bridge 29e, and a wheel 29f.

The upper plate 29a may be disposed in the base hole 22b (see FIG. 28) of the recessed portion 22. The upper plate 29a may contact a groove of the weight 82 in which the recessed portion 22 is received. A fastening member F2, such as a screw, may pass through the upper plate 29a and the base hole 22b and may be coupled to the weight hole 82h2 (see FIG. 29). Accordingly, the upper plate 29a may be coupled to the weight 82.

The lower plate 29b may be disposed below the upper plate 29a. A shaft 29d may pass through the lower plate 29b and the upper plate 29a and may couple the lower plate 29b to the upper plate 29a. The lower plate 29b may rotate about an axial direction of the shaft 29d. The shaft 29d may provide a first axis of rotation of the wheel assembly 29 which is vertically parallel. The bearing 29c may be disposed between the lower plate 29b and the upper plate 29a. For example, the bearing 29c may be a plurality of ball bearings disposed around a circumference of the shaft 29d.

The bridge 29e may extend downward from the lower plate 29b. For example, the bridge 29e may be formed as one body with the lower plate 29b.

The wheel 29f may be rotatably coupled to the bridge 29e and may be coupled to the lower plate 29b via the bridge 29e. The wheel 29f may provide a second axis of rotation of the wheel assembly 29 which is horizontally parallel. A center of rotation 29fc of the wheel 29f may be offset by a certain distance e10 from the axial direction of the shaft 29d. A movement trajectory of the wheel 29f, which corresponds to the rotation of the lower plate 29b, may be formed on the inside of the recessed portion 22.

Further, the wheel 29f may protrude downward beyond the bottom 20a1 of the lower body 20a. That is, the wheel 29f may be placed on the ground, and the bottom 20a1 may be spaced upward from the ground. For example, the wheel 20f may include rubber, silicon, resin, or ABS material.

For example, the wheel assembly 29 may include a plurality of wheel assemblies 291, 292, 293, 294, and 295 which are spaced apart from each other along the circumference of the lower body 20a.

A first wheel assembly 291 may be coupled to the first weight 821 (see FIG. 29) through the base hole 22b (see FIG. 28) of the first recessed portion 221. A second wheel assembly 292 may be coupled to the first weight 821 (see FIG. 29) through the base hole 22b (see FIG. 28) of the second recessed portion 222. A third wheel assembly 293 may be coupled to the second weight 822 (see FIG. 29) through the base hole 22b (see FIG. 28) of the third recessed portion 223. A fourth wheel assembly 294 may be coupled to the third weight 823 (see FIG. 29) through the base hole 22b (see FIG. 28) of the fourth recessed portion 224. A fifth wheel assembly 295 may be coupled to the fourth weight 824 (see FIG. 29) through the base hole 22b (see FIG. 28) of the fifth recessed portion 225.

Accordingly, as the plurality of wheel assemblies 291, 292, 293, 294, and 295 are coupled to the plurality of weights 821, 822, 823, and 824 having flatness corrected by the flat weight 81 (see FIG. 29), the plurality of wheel assemblies 291, 292, 293, 294, and 295 may have improved balance and driving stability.

Meanwhile, a bottom hole 20*h* may be formed by passing through the lower body 20*a* in a thickness direction of the lower body 20*a* and may be adjacent to the circumference of the lower body 20*a*. A position of the bottom hole 20*h* may correspond to a position of the pole 30 (see FIG. 33) coupled to the base 20.

In this case, the first wheel assembly 291 and the second wheel assembly 292 may be adjacent to the bottom hole 20*h*. With respect to a center 0*c* of the base 20, an angle theta a between the first wheel assembly 291 and the second wheel assembly 292 may be a minimum angle among angles between the plurality of wheel assemblies 291, 292, 293, 294, and 295. With respect to the center 0*c* of the base 20, each of an angle theta b between the second wheel assembly 292 and the third wheel assembly 293, an angle theta c between the third wheel assembly 293 and the fourth wheel assembly 294, an angle theta d between the fourth wheel assembly 294 and the fifth wheel assembly 295, and an angle theta e between the fifth wheel assembly 295 and the first wheel assembly 291 may be greater than the angle theta a. For example, the angles theta a, theta b, theta c, theta d, and theta e may be substantially equal to each other.

Accordingly, two or more wheel assemblies, such as the first and second wheel assemblies 291 and 292, may be coupled to the pole 30 (see FIG. 33), thereby stably supporting a portion of the base 20 on which load is concentrated.

Figure 33:
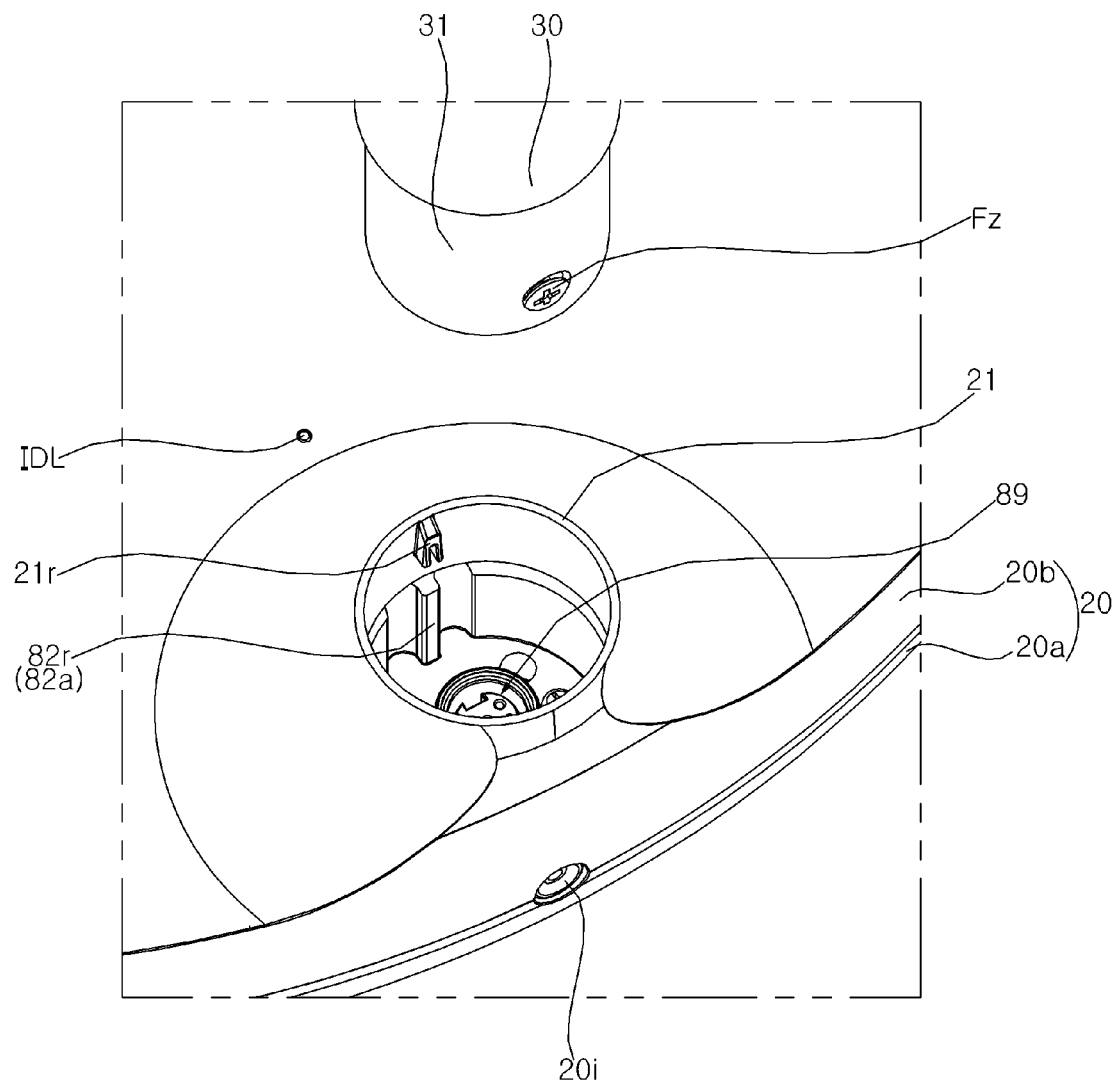
Figure 34:
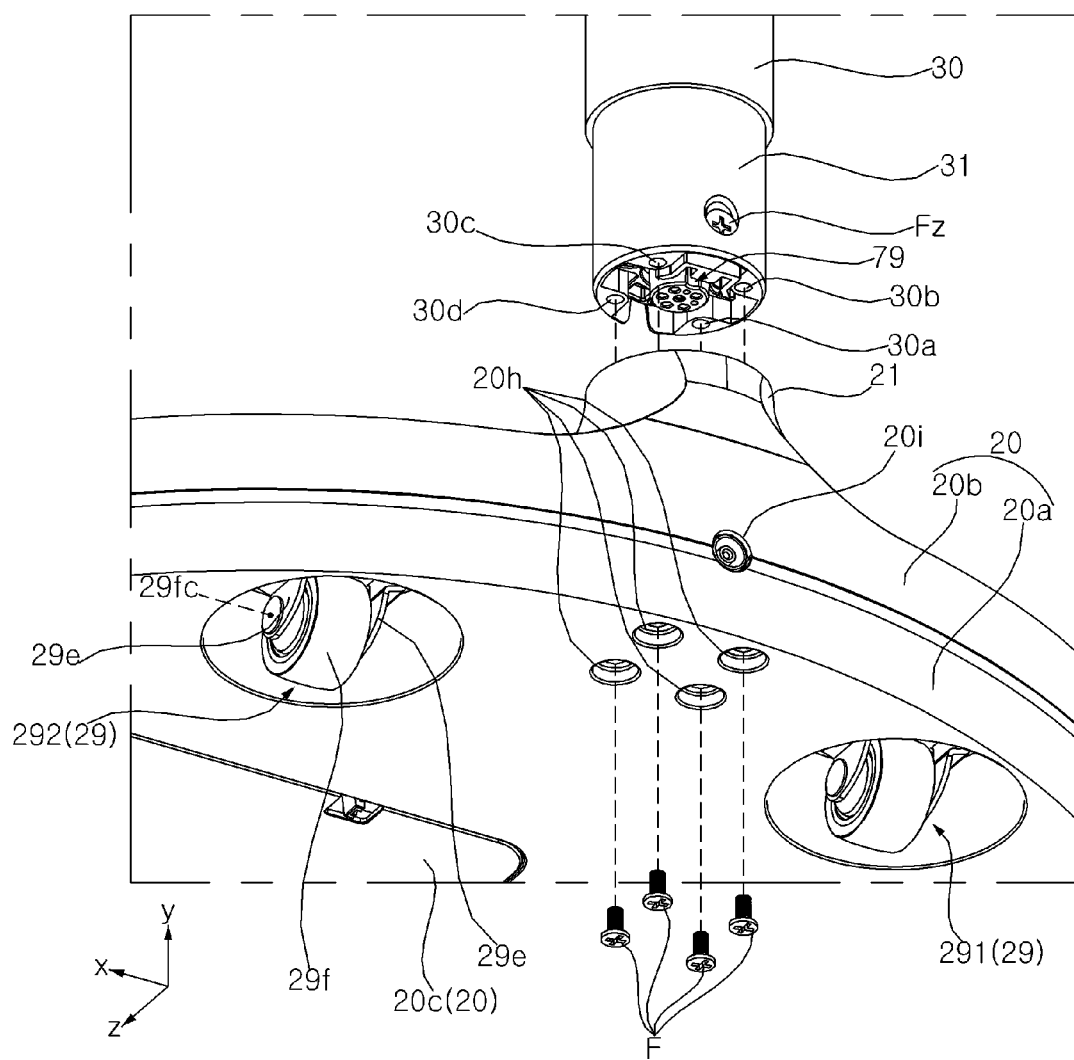
Figure 35:
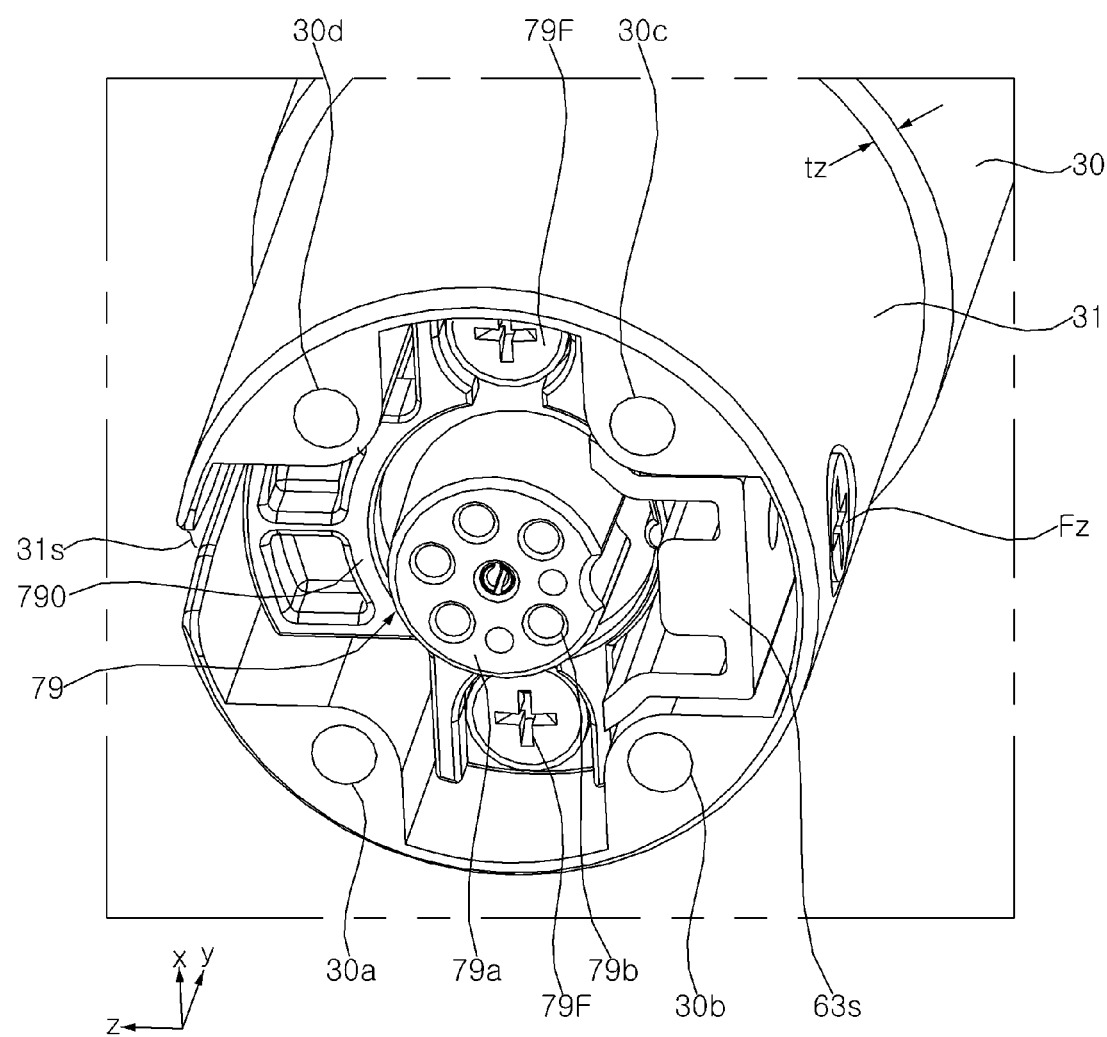

Referring to FIGS. 33 to 35, the port 21 may be formed in the upper body 20*b* and may be in the shape of a monticule. A first guide rib 21*r* may be formed on the inside of the port 21. A second guide rib 82*r* may be formed on a lateral wall of the ridge 82*a*. For example, the second guide rib 82*r* may be defined by grooves formed by cutting out a portion of the lateral wall of the ridge 82*a*. The second guide rib 82*r* may be vertically aligned with the first guide rib 21*r*.

An insertion part 31 may be formed at a lower end of the pole 30. The insertion part 31 may be part of the pole 30. An outer diameter of the insertion part 31 may be smaller than an outer diameter of the pole 30 (see tz of FIG. 35) and may be substantially equal to an inner diameter of the port 21. A guide slit 31*s* may be formed in a lateral surface of the insertion part 31 and may be vertically aligned with the first guide rib 21*r*. When the insertion part 31 is inserted into the port 21, the first guide rib 21*r* and the second guide rib 82*r* may be inserted into the guide slit 31*s*. The insertion part 31, inserted into the port 21, may be surrounded by the ridge 82*a* and may be seated on a seating surface 82*b* of the first weight 821.

A fastening member F, such as a screw, may pass through the bottom hole 20*h*, the coupling part 81P (see FIG. 28), and a hole (see FIG. 38) aligned with the coupling part 81P of the first weight 821 and may be coupled to a plurality of ribs 30*a*, 30*b*, 30*c*, and 30*d* of the pole 30. Accordingly, the pole 30 may be coupled to the port 21.

The stem 63*s* may be partially disposed within the insertion part 31 and may be coupled to the insertion part 31 by a fastening member Fz such as a screw.

A top connector 79 may be disposed inside the insertion part 31 and may be coupled to the stem 63*s* by a fastening member 79F such as a screw. The top connector 79 may face downward. The top connector 79 may be referred to as a top docking connector.

A bottom connector 89 may face upward through the port 21. The bottom connector 89 may be vertically aligned with the top connector 79. The bottom connector 89 may be referred to as a bottom docking connector.

Figure 36:
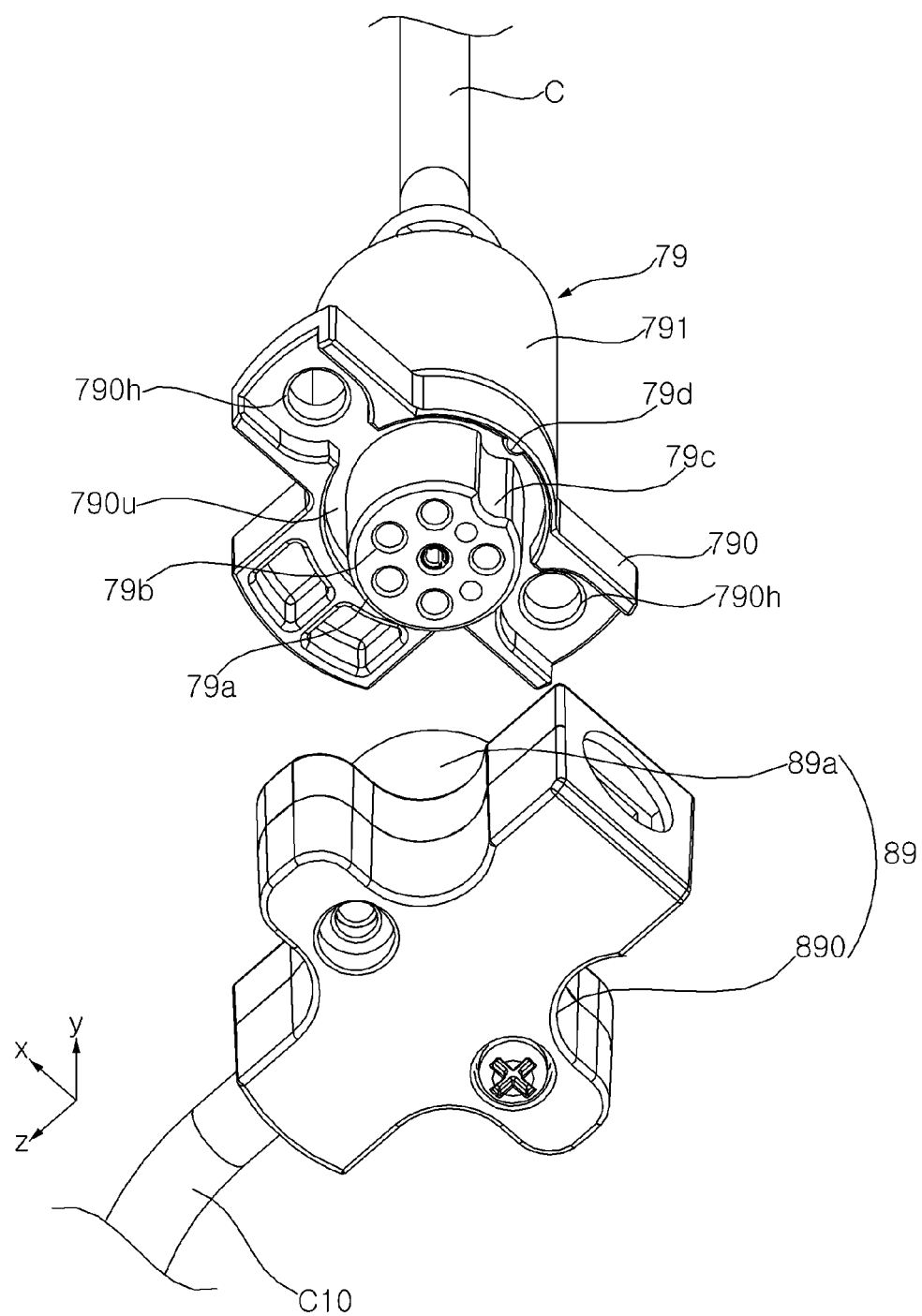
Figure 37:
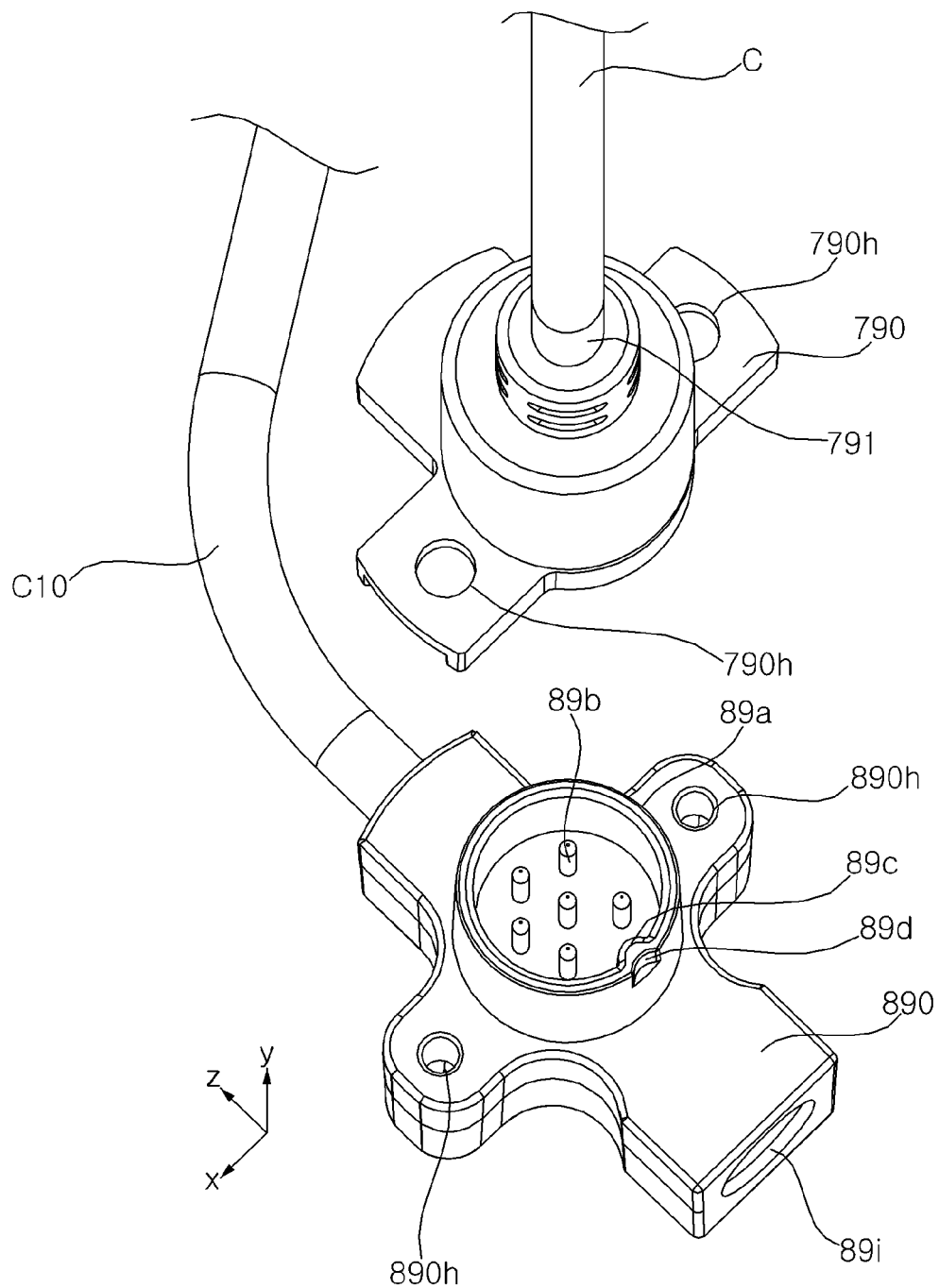
Figure 38:
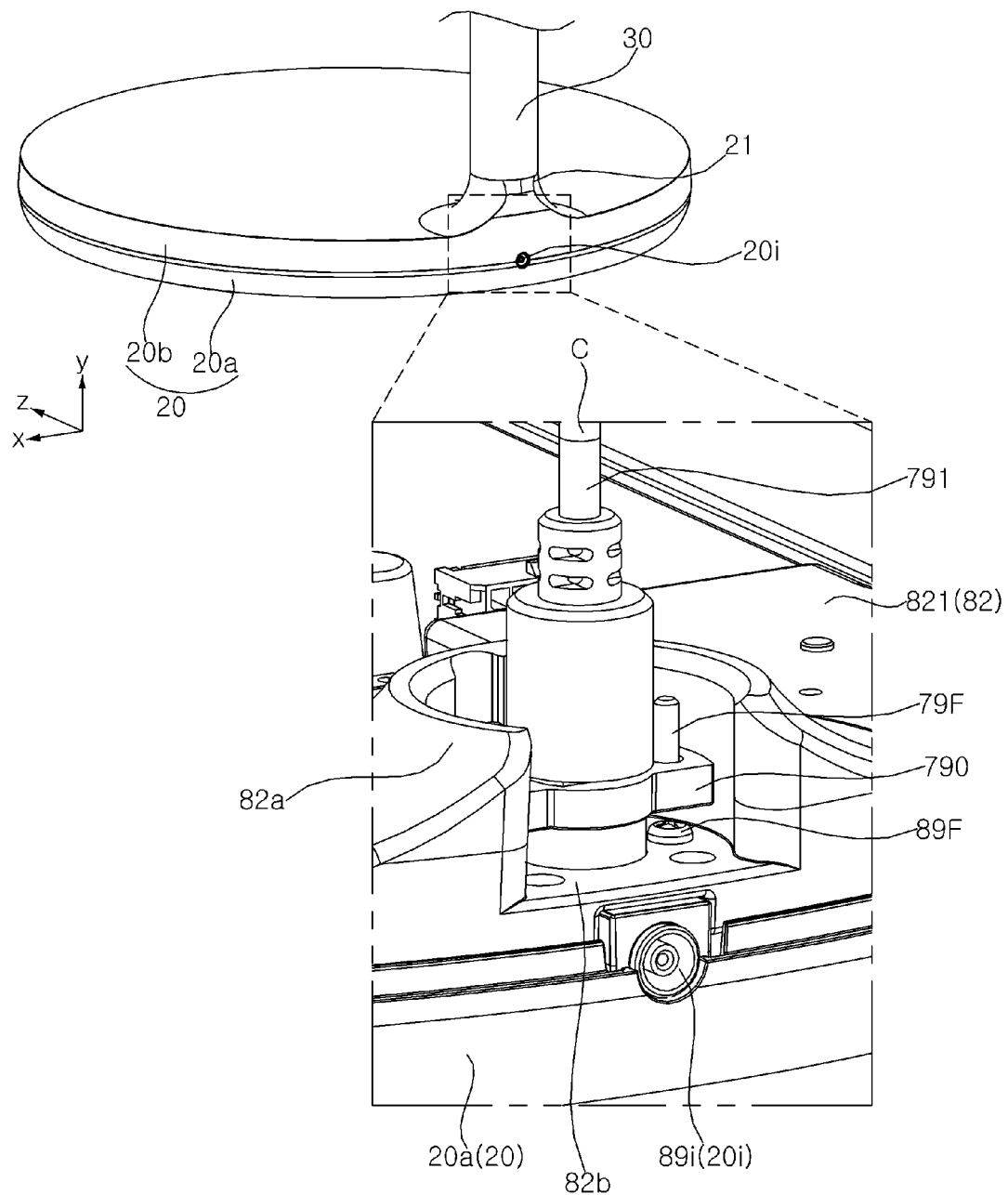

Referring to FIGS. 36 to 38, the top connector 79 may include a top housing 79*a*, at least one pin hole 79*b*, and a bracket 790. The top housing 79*a* may have a cylindrical shape, and the pin hole 79*b* may be formed inside the top housing 79*a*. The bracket 790 may be coupled to an upper surface of the top housing 79*a* and may have an insertion groove 790*u* formed along a circumference of the top housing 79*a*. The bracket 790 may have a hole 790*h* through which the fastening member 79F (see FIG. 35) may pass. A top groove 79*c* may be formed in a lateral surface of the top housing 79*a* and may extend vertically. A top boss 79*d* may protrude toward the insertion groove 790*u* from a portion of the bracket 790 that defines a boundary of the insertion groove 790*u*.

The bottom connector 79 may include the bottom housing 89*a*, the at least one pin 89*b*, and a jack 89*j*. The bottom housing 89*a* may have a hollow cylindrical shape, and the pin 89*b* may be disposed in the inner space of the bottom housing 89*a*. For example, the number of the pins 89*b* may be five or any number. The jack 89*i* may be formed on one side of the bottom connector 89. The bottom boss 89*c* may be formed on the inside of the bottom housing 89*a*. The bottom groove 89*d* may be formed in an outer surface of the bottom housing 89*a* and may face the bottom boss 89*c*.

Accordingly, when insertion part 31 of the pole 30 is inserted into the port 21, the bottom boss 89*c* may be inserted into the top groove 79*c*, and the top boss 79*d* may be inserted into the bottom groove 89*d*. In addition, the pin 89*b* may be inserted into the pin hole 79*b*. In this case, the cable C connected to the top connector 79 and the first cable C10 connected to the bottom connector 89 may be electrically connected to each other through the pin hole 79*b* and the pin 89*b*.

A power cable (not shown) may be electrically connected to the jack 89*i*. In this case, external power may be supplied to the battery Bt through the power cable, the bottom connector 89, the first cable C10, the first terminal T11, the substrate BC, the second terminal T12, and the second cable C11, thereby charging the battery Bt (see FIG. 29 and the like).

The power cable may be removed from the jack 89*i*. In this case, the power of the battery Bt may be supplied to the head 10 through the second cable C11, the second terminal T12, the substrate BC, the first terminal T11, the first cable C10, the bottom connector 89, the top connector 79, and the cable C.

The indicator ID may be electrically connected to a third terminal T13 of the substrate BC through the third cable C12 and may detect a remaining capacity of the battery Bt. A light emitting element IDL (see FIG. 33) of the indicator ID may be formed on the upper body 20*b* and may display a remaining capacity of the Battery Bt for a user.

Figure 39:
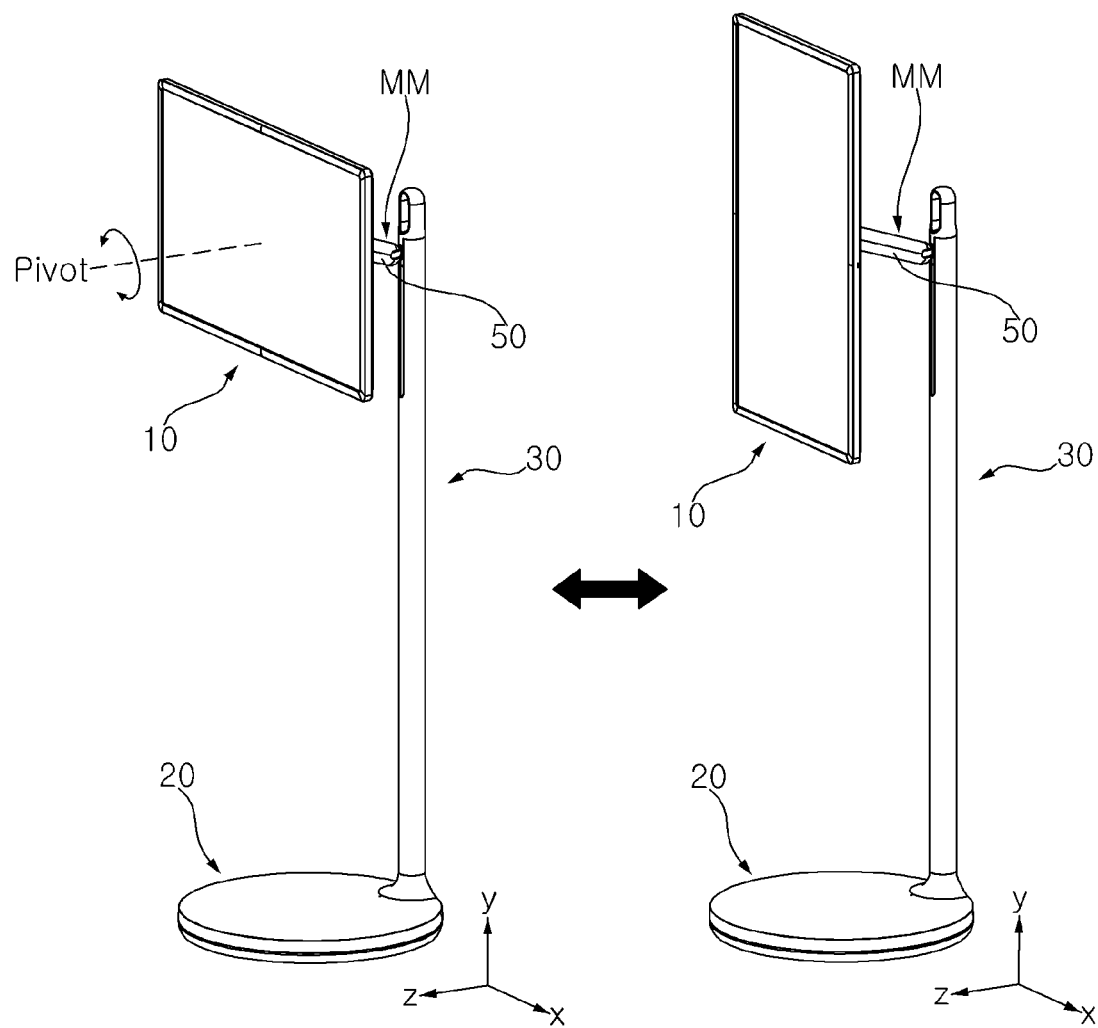

Referring to FIG. 39, the head 10 may be spaced upward from the base 20. A user may pivot the head 10. A pivot axis may pass through the center of the head 10 and may be orthogonal to the head 10. Referring to the left drawing of FIG. 39, the head 10 may be positioned in a horizontal mode. Referring to the right drawing of FIG. 39, the head 10 may be positioned in a vertical mode.

Figure 40:
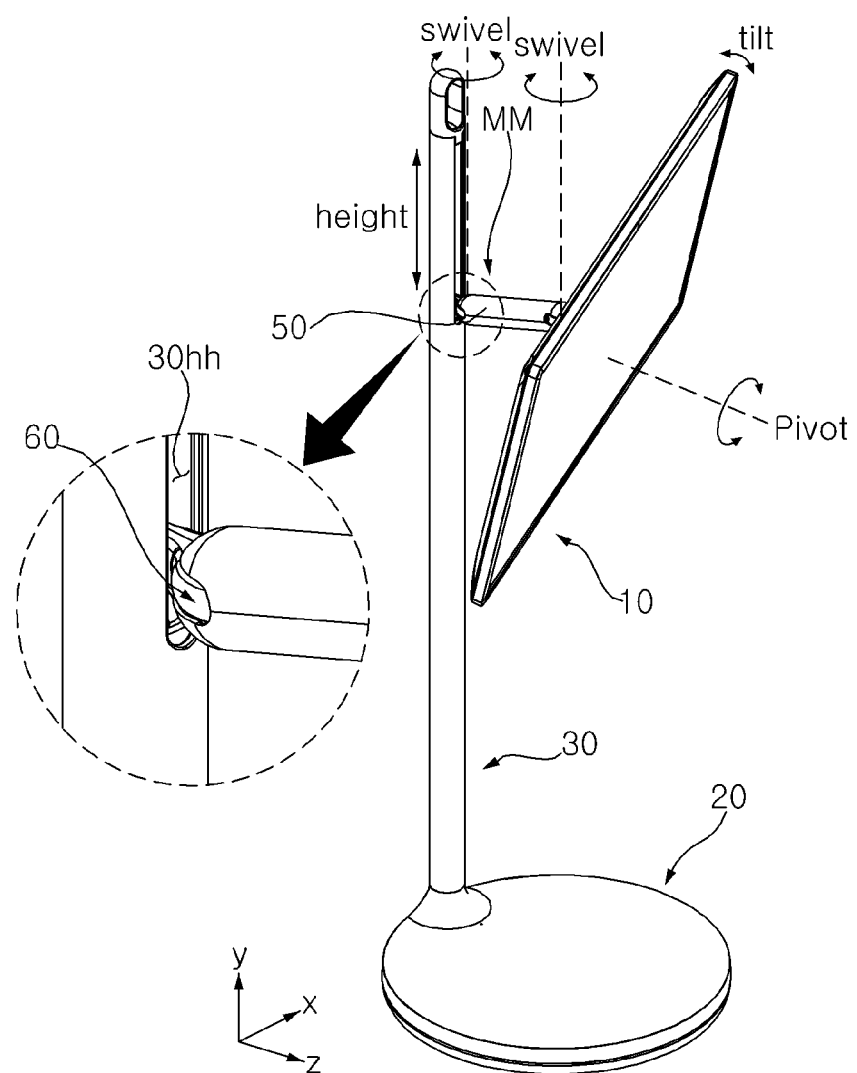

Referring to FIG. 40, a user may tilt the head 10. A tilt axis is located behind the center of the head 10 and may be a horizontal axis parallel to the head 10. The user may swivel the head 10. A first swivel axis may be a vertical axis adjacent to a first end of the arm 50. A second swivel axis may be a vertical axis adjacent to a second end of the arm 50. The user may raise or lower the head 10 along the pole 30.

The pivot, tilt, swivel, and elevating motions of the head 10 described above may be performed independently of each other. For example, the head 10 may pivot within a range of +90 degrees to −90 degrees. For example, the head 10 may be tilted within a range of +25 degrees to −25 degrees. For example, the head 10 may swivel within a range of +65 degrees to −65 degrees. For example, in the horizontal mode, the head 10 may be located at a position of 1065 mm to 1265 mm above the base 20 or the ground.

Referring to FIGS. 39 and 40, the base 20 may stably support various motions of the display device by using the motion module MM. In addition, the base 20 may improve stability of movement of the display device by using the wheel assembly 29 (see FIG. 34).

Referring to FIGS. 1 to 40, a display device according to an embodiment of the present disclosure may include: a head including a display panel; an arm to which the head is pivotally coupled; a pole to which the arm is coupled; and a base to which the pole is coupled, wherein the base includes: a lower body forming a bottom; an upper body which is coupled to the lower body and to which the pole is fixed; a weight disposed between the lower body and the upper body; and a wheel disposed outside of the lower body, passing through the lower body and coupled to the weight.

The pole may be adjacent to an edge of the upper body, and the wheel may include a plurality of wheels coupled to the weight, wherein the plurality of wheels may include: a first wheel adjacent to a position corresponding to the pole of the lower body; and a second wheel opposite to the first wheel with respect to the position corresponding to the pole of the lower body, wherein with respect to a center of the lower body, an angle between the first wheel and the second wheel may be a minimum angle among angles between the plurality of wheels.

The base may further include a flat weight which is disposed between the lower body and the weight and to which the weight is coupled, wherein the wheel may pass through the lower body and the flat weight and is coupled to the weight.

The flat weight may be formed flat, and a mass of the weight may be greater than a mass of the flat weight.

The lower body may be directly coupled to the flat weight and the weight, and the weight may be directly coupled to the flat weight.

The flat weight may have a circular plate shape, and the weight may include a plurality of weights disposed along an edge of the flat weight.

The lower body may further include a recessed portion formed from the lower body toward the upper body, the recessed portion having a base hole facing the weight, wherein the flat weight may further include major arcs formed at an edge of the flat weight and extending along a portion of a lateral surface of the recessed portion, wherein the wheel may be coupled to the weight through the base hole.

The lower body may further include recessed portions formed from the lower body toward the upper body and accommodating a portion of the wheel, wherein the wheel may include a first axis of rotation intersecting the lower body and passing through the recessed portion; and a second axis of rotation parallel to the lower body and offset by a certain distance from the first axis of rotation.

The display device may further include a wheel assembly having the wheel, wherein the wheel assembly may include: an upper plate fixed to the weight; a lower plate opposite to the upper plate; a shaft which passes through the lower plate and the upper plate and to which the lower plate is coupled so as to be rotatable about the second axis of rotation; a bearing disposed between the upper plate and the lower plate; and a bridge which extends from the lower plate toward the wheel and to which the wheel is coupled so as to be rotatable about the second axis of rotation.

The lower body may include a lateral wall forming a perimeter of the lower body; and a support rib formed at an inside of the lateral wall, wherein the weight may be adjacent to the lateral wall, and the support rib may be adjacent to or may contact a lateral surface of the weight.

The upper body may be coupled to the lower body by a snap-fit connection, and the upper body and the lower body may include a plastic material.

The upper body may further include a port through which the pole is inserted and which is seated on the weight, wherein the weight may further include: a ridge formed at an upper surface of the weight and surrounding the pole inserted into the port; and a fastening member passing through the lower body and the weight and coupled to the pole.

The pole may include an insertion part inserted into the port, the insertion part having a slit formed at a lateral surface of the insertion part, wherein the port may further include a first guide rib formed at an inside of the port and inserted into the slit, and the ridge may further include a second guide rib formed at a lateral surface of the ridge and inserted into the slit.

The display device may further include: a top connector disposed inside the pole; and a bottom connector disposed on the weight, coupled to the top connector, and electrically connected to the top connector.

The display device may further include a battery disposed between the lower body and the upper body, coupled to the lower body, and electrically connected to the bottom connector.

The display device according to the present disclosure has the following effects.

According to at least one of the embodiments of the present disclosure, a display device including a stand for a display panel may be provided.

According to at least one of the embodiments of the present disclosure, a structure for freely adjusting an angle or position of a head having a display panel may be provided.

According to at least one of the embodiments of the present disclosure, a structure for allowing various motions of a head, including a pivot motion, a tilt motion, a swivel motion, and an elevating motion, to be performed independently of each other may be provided.

According to at least one of the embodiments of the present disclosure, a structure for improving standing stability of a display device may be provided.

According to at least one of the embodiments of the present disclosure, a structure for improving driving stability of a moving base having a wheel may be provided.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

What is claimed is:

1. A display device comprising: a base; a head spaced apart from the base and including a display panel; a pole extending from the base toward the head; a connector coupled to the head; an elevating module coupled to the pole and moving at the pole in a length direction of the pole; and an arm including one side connected to the connector and the other side connected to the elevating module; wherein the base comprises: an upper case into which the pole is inserted; a lower case coupled with the upper case and including a wheel housing recessed into an inner side of the base; a wheel assembly at the wheel housing; and a weight disposed in the base between the upper case and the lower case and including a groove recessed in a direction from the lower case to the upper case, the groove of the weight corresponding to the wheel housing of the lower case, wherein the groove of the weight includes a wheel mount surface and a wall surface surrounding the wheel mount surface, wherein a part of the wall surface of the groove is opened toward an outer side of the base, and wherein the wheel assembly is fixed to the wheel mount surface of the groove of the weight.

2. The display device of claim 1, wherein the base has a circular shape and the opened part of the wall surface of the groove is facing the outer side of the base in a radial direction of the base.

3. The display device of claim 1, wherein the wheel assembly includes:
a plate fixed to the wheel mount surface of the groove of the weight;
a bridge rotatably connected to the plate; and
a wheel rotatably connected to the bridge,
wherein a fastening member fixes the plate to the wheel mount surface of the groove of the weight such that the wheel assembly is coupled with the weight through the lower case.

4. The display device of claim 3, wherein the wheel housing of the lower case includes a base hole exposing the wheel mount surface of the groove of the weight to an outside of the base, and
wherein the fastening member is inserted into the base hole of the wheel housing such that the fastening member fixes the plate of the wheel assembly to the weight.

5. The display device of claim 1, wherein the weight includes an upper surface facing the upper case of the base and a lower surface facing the lower case of the base, the groove of the weight formed on the lower surface of the weight, wherein the weight further comprises: a ridge raised at the upper surface of the weight; and a seating surface stepped down from the ridge or the upper surface of the weight, and wherein the pole is inserted into the ridge such that the pole is disposed onto the seating surface.

6. The display device of claim 5, wherein the ridge of the weight faces the upper case of the base and the groove of the weight faces the lower case of the base.

7. The display device of claim 6, wherein the weight includes a plurality of grooves adjacent to each other, and
wherein the ridge of the weight is positioned between the plurality of grooves of the weight.

8. The display device of claim 7, wherein the ridge and the plurality of grooves are formed at the weight as one body.

9. The display device of claim 8, wherein the lower case includes a plurality of wheel housings,
wherein the base has a circular shape with a center point and each of the plurality of wheel housings is disposed along a circumference direction of the base,
wherein a pair of the wheel housings among the plurality of wheel housings between which the ridge is positioned has a first angle with respect to the center point and other wheel housings among the plurality of wheel housings has a second angle with respect to the center point, and
wherein the first angle is smaller than the second angle.

10. The display device of claim 7, wherein fastening members penetrate the seating surface of the weight and is coupled with the pole such that the fastening members fix the pole to the weight.

11. The display device of claim 1, wherein the wheel housing of the lower case is inserted into the groove of the weight such that the wheel housing of the lower case supports the weight and the weight supports the pole.

12. The display device of claim 11, wherein the weight includes a plurality of grooves adjacent to each other,
wherein the lower case of the base includes a plurality of wheel housings, each of the plurality of wheel housings corresponding to each of the plurality of grooves, and
wherein the pole is positioned between the plurality of grooves of the weight.

13. The display device of claim 12, wherein the weight further comprises a ridge surrounding a lower part of the pole on an upper surface of the weight facing the upper case of the base, and wherein the ridge is raised at the upper surface of the weight such that the ridge supports an outer side of the lower part of the pole and the upper surface of the weight supports a bottom end of the lower part of the pole.

14. The display device of claim 13, wherein fastening members penetrate the upper surface of the weight and are inserted into the lower part of the pole such that the fastening members fix the pole to the weight.

15. The display device of claim 14, wherein the pole has a cylindrical shape and includes a plurality of ribs at an inner side of the pole, the plurality of ribs extending in the length direction of the pole, and wherein each of the fastening members is respectively fixed to the plurality of ribs of the pole.

16. The display device of claim 1, wherein the wheel assembly includes:
a plate fixed to the wheel mount surface of the groove of the weight;
a bridge rotatably connected to the plate; and
a wheel rotatably connected to the bridge,
wherein the wheel housing of the lower case includes a base hole exposing the wheel mount surface of the groove of the weight to an outside of the base,
wherein a first fastening member fixes the plate of the wheel assembly to the wheel mount surface of the groove of the weight such that the wheel assembly is coupled with the weight through the base hole, wherein the wheel housing of the lower case further includes a lower fixing hole next to the base hole, and wherein a second fastening member is inserted into the lower fixing hole.

17. The display device of claim 16, wherein the weight includes an upper fixing hole at the wheel mount surface of the groove of the weight, and wherein the second fastening member is inserted into the lower fixing hole of the lower case and the upper fixing hole of the weight.

18. The display device of claim 17, wherein the upper fixing hole is formed to penetrate the wheel mount surface of the groove of the weight and an upper surface of the weight, and wherein the upper surface of the weight faces the upper case of the base and the wheel mount surface of the groove of the weight faces the lower case of the base.

19. The display device of claim 18, wherein an upper surface of the wheel housing of the lower case is in contact with the wheel mount surface of the groove of the weight.

\* \* \* \* \*